United States Patent
Matsushima

(10) Patent No.: US 11,775,240 B2
(45) Date of Patent: Oct. 3, 2023

(54) INFORMATION PROCESSING SYSTEM, INFORMATION PROCESSING METHOD, STORAGE MEDIUM, AND INFORMATION PROCESSING APPARATUS

(71) Applicant: Hiroyuki Matsushima, Kanagawa (JP)

(72) Inventor: Hiroyuki Matsushima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/692,181

(22) Filed: Mar. 11, 2022

(65) Prior Publication Data
US 2022/0300218 A1 Sep. 22, 2022

(30) Foreign Application Priority Data
Mar. 18, 2021 (JP) .............................. JP2021-045179

(51) Int. Cl.
*G06F 3/12* (2006.01)
*G06Q 30/0207* (2023.01)

(52) U.S. Cl.
CPC ............ *G06F 3/126* (2013.01); *G06F 3/1207* (2013.01); *G06F 3/1208* (2013.01); *G06F 3/1239* (2013.01); *G06Q 30/0207* (2013.01)

(58) Field of Classification Search
CPC ...... G06F 3/126; G06F 3/1207; G06F 3/1208; G06F 3/1239; G06Q 30/0207
See application file for complete search history.

(56) References Cited

U.S. PATENT DOCUMENTS

| | | | |
|---|---|---|---|
| 7,330,833 B1* | 2/2008 | Robb | G06Q 40/04 705/37 |
| 2003/0228016 A1* | 12/2003 | Shimada | H04N 1/4486 380/213 |
| 2010/0220348 A1 | 9/2010 | Matsushima | |
| 2010/0259780 A1* | 10/2010 | Shrader | G06F 11/34 358/1.15 |
| 2014/0020117 A1 | 1/2014 | Nagai et al. | |
| 2014/0223570 A1 | 8/2014 | Matsushima et al. | |
| 2014/0289817 A1 | 9/2014 | Matsushima | |
| 2015/0169849 A1 | 6/2015 | Takemoto et al. | |
| 2016/0006796 A1 | 1/2016 | Matsushima et al. | |
| 2016/0125174 A1 | 5/2016 | Matsushima | |
| 2017/0251122 A1 | 8/2017 | Matsushima et al. | |
| 2017/0372084 A1* | 12/2017 | Murashita | H04L 9/16 |
| 2019/0243584 A1* | 8/2019 | Yashiro | G06F 3/1288 |
| 2019/0303544 A1 | 10/2019 | Matsushima | |
| 2020/0044908 A1 | 2/2020 | Matsushima | |
| 2020/0285424 A1* | 9/2020 | Matsuzaka | G06F 3/1226 |

FOREIGN PATENT DOCUMENTS

| | | |
|---|---|---|
| JP | 2005-085104 | 3/2005 |
| JP | 2010-287096 | 12/2010 |
| JP | 2020-087380 | 6/2020 |
| JP | 2021-086569 | 6/2021 |
| WO | WO2015/174157 A1 | 11/2015 |

* cited by examiner

*Primary Examiner* — Iriana Cruz
(74) *Attorney, Agent, or Firm* — XSENSUS LLP

(57) ABSTRACT

An information processing system includes processing circuitry. The processing circuitry is configured to: acquire profile information including a profile to be applied to print output from a first company system; manage the profile information acquired from the first company system; and distribute the profile information to a second company system to apply the profile information to a job executed by a printing machine of the second company system.

18 Claims, 17 Drawing Sheets

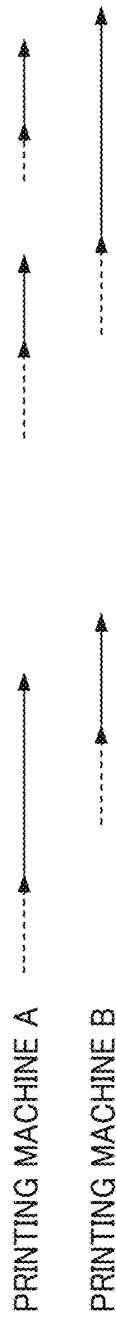

$$\text{PREPARATION TIME} = T_{pc} + T_{if} + T_{hc} + T_{ac} + T_{tp}$$

$$\text{EXECUTION TIME} = T_{pc} + T_{if} + T_{hc} + T_{ac} + T_{pp}$$

FIG. 18

JOB EXECUTION ~2100

| CUSTOMER | YOKOHAMA SALES OFFICE OF ABC AUTOMOBILE |
|---|---|
| FILE | EFG.PDF |
| NUMBER OF COPIES | 10 |
| SHEET OF PAPER | SHEET TYPE XXX |
| PROFILE | CLEAR BLUE ∨ ~2105 |

[EXECUTE] ~2111

FIG. 19

PROFILE LIST ~2200

| PROFILE NAME | DESCRIPTION | SHEET OF PAPER | INK | CREATION DATE | PURCHASE REGISTRATION |
|---|---|---|---|---|---|
| CLEAR BLUE | VIVID COLORING OF BLUE IS ··· | SHEET XXX | INK AAA | 2019/12/1 | REGISTER |
| CLEAR GREEN | VIVID COLORING OF GREEN IS ··· | SHEET YYY | INK BBB | 2020/2/1 | REGISTER |
| CAR CATALOG | SPECIALIZED FOR USE FOR CATALOG ··· | SHEET ZZZ | INK BBB | 2020/10/1 | REGISTER |
| ··· | ··· | ··· | ··· | ··· | REGISTER |
| ··· | ··· | ··· | ··· | ··· | REGISTER |

| | | |
|---|---|---|
| PROFILE PURCHASE REGISTRATION | 2301 | 2302 |
| PROFILE NAME | CLEAR BLUE | |
| DESCRIPTION | VIVID COLORING OF BLUE IS OBTAINED | |
| SHEET OF PAPER | SHEET XXX | |
| INK | INK AAA | |
| UPPER LIMIT | 30 (UNIT: ●DAY ○NUMBER OF TIMES ○PAGE) | |
| FEE | 10000 YEN | |
| EXECUTE ~2311 | 2305 2306 | |

| PROFILE PURCHASE | | | | | | | | |
|---|---|---|---|---|---|---|---|---|
| PROFILE NAME | SELLER | FEE | UPPER LIMIT | DESCRIPTION | SHEET OF PAPER | INK | REGIS-TERED DATE | PURCHASE REGISTRA-TION |
| CLEAR BLUE | ABC PRINTING | 10,000 YEN | 30 DAYS | VIVID COLORING OF BLUE IS ··· | SHEET XXX | INK AAA | 2020/12/2 | REGISTER |
| CLEAR GREEN | DEF PRINT | 5,000 YEN | 50 TIMES | VIVID COLORING OF GREEN IS ··· | SHEET YYY | INK BBB | 2019/9/9 | REGISTER |
| PORTRAIT & FAMILY | XYZ STUDIO | 20,000 YEN | 1000 PAGES | FACE COLOR IS ··· | SHEET ZZZ | INK CCC | 2020/3/3 | REGISTER |
| ··· | ··· | ··· | ··· | ············ | ··· | ··· | ··· | REGISTER |
| ··· | ··· | ··· | ··· | ············ | ··· | ··· | ··· | REGISTER |

INFORMATION PROCESSING SYSTEM, INFORMATION PROCESSING METHOD, STORAGE MEDIUM, AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2021-045179, filed on Mar. 18, 2021, in the Japan Patent Office, the entire disclosure of which is incorporated by reference herein.

BACKGROUND

Technical Field

Embodiments of the present disclosure relate to an information processing system, an information processing method, a storage medium, and an information processing apparatus.

Related Art

As a system capable of selecting a specific seller, a configuration has been proposed in which a trade information exchange system selects a seller so that a customer can receive estimates or discount coupons from a plurality of sellers and select a favorite seller.

SUMMARY

According to an embodiment of the present disclosure, there is provided an information processing system that includes processing circuitry. The processing circuitry acquires profile information including a profile to be applied to print output from a first company system, manages the profile information acquired from the first company system, and distributes the profile information to a second company system to apply the profile information to a job executed by a printing machine of the second company system.

According to another embodiment of the present disclosure, there is provided an information processing method that includes: acquiring, from a first company system, profile information including a profile to be applied to print output; managing the profile information acquired by the acquiring; and distributing the profile information to a second company system to apply the profile information to a job executed by a printing machine of the second company system.

According to still another embodiment of the present disclosure, there is provided a non-transitory computer-readable storage medium having instructions stored thereon, which when executed by one or more processors, cause the one or more processors to execute: acquiring, from a first company system, profile information including a profile to be applied to print output; managing the profile information acquired by the acquiring; and distributing the profile information to a second company system to apply the profile information to a job executed by a printing machine of the second company system.

According to still yet another embodiment of the present disclosure, there is provided an information processing apparatus that includes processing circuitry. The processing circuitry acquires profile information including a profile to be applied to print output from a first company system, manages the profile information acquired from the first company system, and sets the profile information to be applied to a job executed by a printing machine.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 8 is a diagram illustrating an example of a job registration screen;

FIG. 9 is a diagram illustrating print preparation and printing of a job by arrow lines;

FIG. 18 is a diagram illustrating a job execution screen according to an embodiment of the present disclosure;

FIG. 19 is a diagram illustrating a profile list screen according to an embodiment of the present disclosure;

FIG. 20 is a diagram illustrating a profile sales registration screen according to an embodiment of the present disclosure; and FIG. 21 is a diagram illustrating a profile purchase screen according to an embodiment of the present disclosure.

Figure 1:
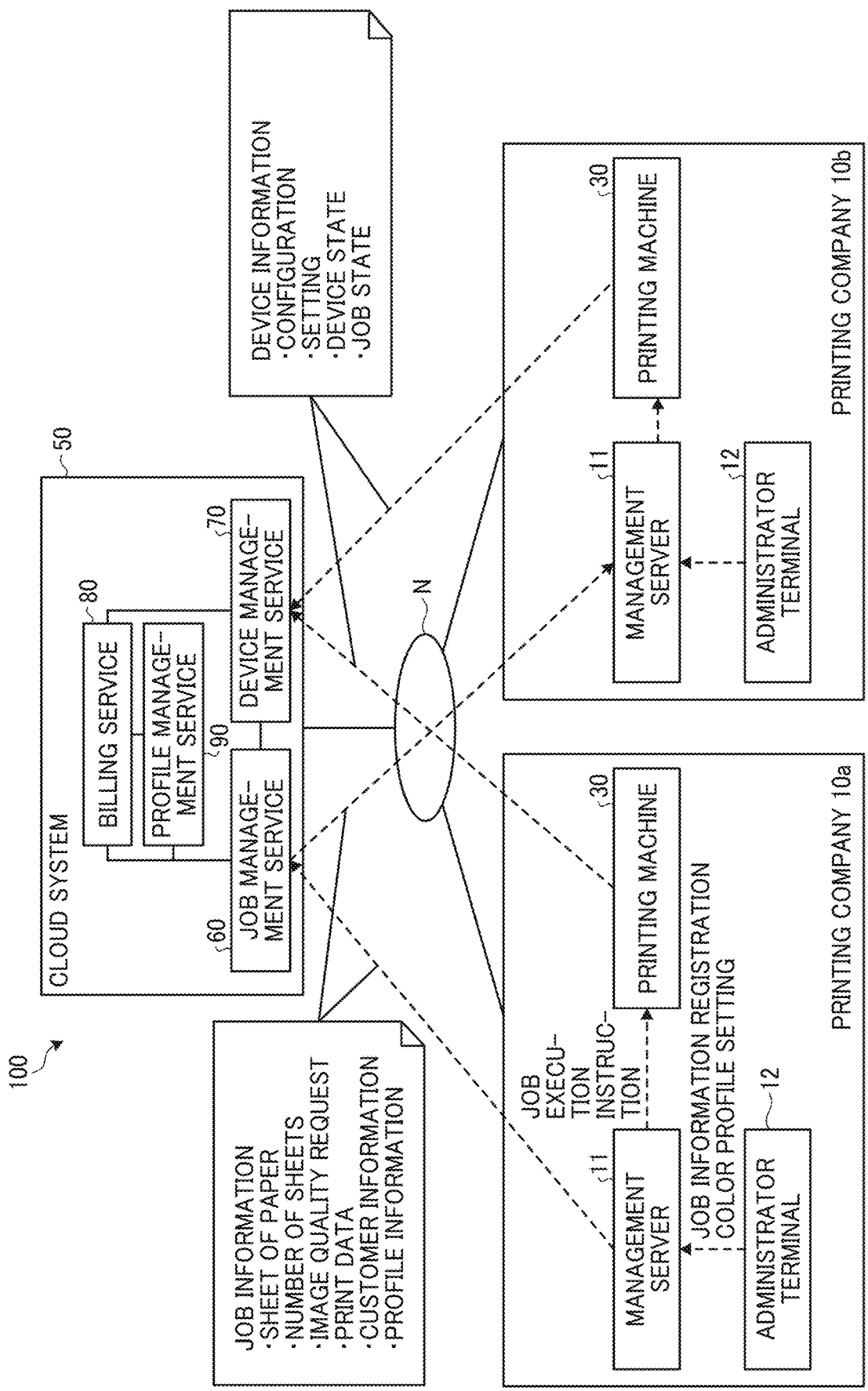
FIG. 1 is a diagram illustrating a schematic configuration of a device system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, an information processing system, an information processing method, a recording medium storing an information processing program, and an information processing apparatus according to embodiments of the present disclosure are described with reference to the accompanying drawings. The present invention is not limited by the following embodiments, and the components and elements in the following embodiments include those that can be easily conceived from the components and elements by those skilled in the art, substantially the same components and elements, and so-called equivalent ranges of components and elements. Various omissions, substitutions, changes, and combinations of components and elements can be made without departing from the gist of the following embodiments.

First Embodiment

Schematic Configuration of Device System

FIG. 1 is a diagram illustrating a schematic configuration of a device system according to a first embodiment of the present disclosure. A schematic configuration of a device system 100 according to the present embodiment is described below with reference to FIG. 1.

As illustrated in FIG. 1, the device system 100 includes: a cloud system 50; a management server 11, an administrator terminal 12, and a printing machine 30 of a printing company 10a; and a management server 11, an administrator terminal 12, and a printing machine 30 of a printing company 10b. The cloud system 50 and the management server 11, the administrator terminal 12, and the printing machine 30 of each of the printing companies 10a and 10b can perform data communications with each other via a network N. The printing companies 10a and 10b are simply referred to as "printing company 10" or "printing companies 10" when any printing company is indicated or collectively referred to. In the example illustrated in FIG. 1, only two printing companies 10 (printing companies 10a and 10b) are illustrated, but embodiments of the present disclosure are not limited to this. In other embodiments, three or more printing companies 10 may be present in a device system.

The management server 11, the administrator terminal 12, and the printing machine 30 of the printing company 10a are an example of a "first company system" according to embodiments of the present disclosure, and the management server 11, the administrator terminal 12, and the printing machine 30 of the printing company 10b are an example of a "second company system" according to embodiments of the present disclosure.

Since the cloud system 50 is used in the present embodiment, the network N is a network including the Internet. In the printing company 10, a local area network (LAN), a wide area network (WAN), and the like are used. Note that job information may be encrypted in communication via the Internet. As described below, at least profile information is encrypted and transmitted in this embodiment. A virtual private network (VPN) may be used as the network N.

The printing company 10 means a company having facilities for printing such as a printing factory, a printing place, or a predetermined building. The system of each printing company 10 includes the management server 11, the administrator terminal 12, and the printing machine 30. The management server 11, the administrator terminal 12, and the printing machine 30 may be capable of data communication with each other via a network in the system of the printing company 10.

The management server 11 is an information processing apparatus such as a personal computer (PC) or a workstation that receives registration of job information and setting of a color profile from the administrator terminal 12 and instructs the printing machine 30 to apply the set color profile (hereinafter, may be simply referred to as a profile) to a job to execute the job. For example, the management server 11 may cause the administrator terminal 12 to display a screen for accepting registration of job information and setting of a profile as a Web server. In this case, since a browser is operating, the administrator terminal 12 displays a Web page that displays the above-described screen transmitted from the management server 11 serving as a Web server.

The management server 11 determines whether the received job information (including information on a profile (profile information)) is to be printed by the printing machine 30 owned by the printing company 10 or transmitted to the cloud system 50. The management server 11 determines whether the job information is to be printed by the printing machine 30 or transmitted to the cloud system 50 based on a predetermined rule. For example, the management server 11 detects an idle time from the schedule information of the printing machine 30, calculates a preparation time and an execution time of the received job, and determines whether the received job can be executed within the idle time. The management server 11 also determines whether the set profile is applicable to the job. In the determination, the management server 11 predicts the state of the printing machine 30 at the start time of the idle time, and predicts the preparation time based on the predicted state of the printing machine 30 and the state of the printing machine 30 set based on the received job information. When the management server 11 determines that the job information is to be transmitted to the cloud system 50, the management server 11 encrypts at least the profile information included in the job information with its own private key and transmits the encrypted profile information to the cloud system 50.

In the example illustrated in FIG. 1, the management server 11 is installed in an on-premises manner, but may be implemented by a cloud server. In some embodiments, the management server 11 may be integrated with the printing machine 30.

The above-described job refers to a unit of print processing. For example, printing a certain number of sheets or a certain document is a job. In the present embodiment, the printing by the printing machine 30 is the execution of the job. However, what kind of processing the execution of the job is specifically depends on the type of the printing machine 30. Further, as the output obtained by the execution of the job, the result may be simply displayed, stored in the cloud, transmitted by mail, or notified to the user. Alternatively, the job information is information related to a job, but in the present embodiment, a job and job information are not strictly distinguished from each other. The job schedule information indicates a start time and an end time at which a job is scheduled to be executed in a certain printing machine 30.

The administrator terminal 12 is an information processing terminal such as a PC, a tablet terminal, or a smartphone that is used by the printing company 10. The printing company 10 attempts to register the received job information in the management server 11 via the administrator terminal 12. As described above, since a browser is operating, the administrator terminal 12 displays a Web page that displays the above-described screen transmitted from the management server 11 serving as a Web server. The administrator terminal 12 transmits, to the management server 11, job information and profile information set in a Web page (which is also a screen displayed by the administrator terminal 12) by the printing company 10.

The printing machine 30 is an image forming apparatus such as a production printer, a color inkjet printer, or a color or monochrome multifunction peripheral (MFP). The printing method of the printing machine 30 is, for example, an electrophotographic method, an inkjet method, relief printing, intaglio printing, planographic printing, or stencil printing, and is not limited to those methods and may be any method capable of printing. Further, the printing machine 30 may be connected to a finisher (post-processing apparatus) for performing post-processing (post-processing) such as sheet folding, saddle stitching, case binding, and punching on printed recording media. The printing machine 30 may have, for example, a scanner function, a facsimile function, or a copy function.

When the printing machine 30 is a commercial printing device, the printing machine 30 is controlled by a digital front end (DFE). For this reason, the management server 11, the printing machine 30, or a device independent thereof may have a DFE. In this embodiment, the management server 11 includes a DFE. The DFE creates schedule information of a job to be printed by the printing machine 30 based on settings from the administrator terminal 12, and instructs the printing machine 30 to execute the job based on the schedule information. The DFE is also referred to as a print controller and controls printing by the printing machine 30. When acquiring a job, the DFE uses a job definition format (JDF) and a page description language (PDL) to generate raster data for the printing machine 30 to form a toner image or an image with ink, and transmits the raster data to the printing machine 30.

The cloud system 50 is an information processing system including one or more information processing apparatuses that determine and distribute job information including profile information received from a specific printing company 10 to an executable printing company 10. Here, the term "cloud" is an abbreviation of cloud computing, and refers to a usage form in which resources on a network are used without being aware of specific hardware resources. Although the term cloud is used in contrast to the term on-premises, the cloud system 50 may be external or internal to an in-house LAN. One or more information processing apparatuses included in the cloud system 50 function as a server to provide various types of information and processing results in response to requests from clients.

As illustrated in FIG. 1, the cloud system 50 includes a job management service 60, a device management service 70, a billing service 80, and a profile management service 90. Each service is a function provided by the cloud system 50. In the cloud system 50, four servers respectively corresponding to the job management service 60, the device management service 70, the billing service 80, and the profile management service 90 may exist, or one or more servers may implement the job management service 60, the device management service 70, the billing service 80, and the profile management service 90. Applications respectively corresponding to the job management service 60, the device management service 70, the billing service 80, and the profile management service 90 operate on the servers, and the applications can communicate with each other. Each application communicates via, for example, a Web application programming interface (API). Although there is no strict definition in the Web API, it is an interface between applications or systems called over a network using a protocol such as Hypertext Transfer Protocol (HTTP).

The job management service 60 receives the job information including profile information from the management server 11 of each printing company 10, centrally manages the job information, refers to device information managed by the device management service 70, and distributes the job information including the profile information to an appropriate printing company 10.

The device management service 70 receives the device information from each printing machine 30 and provides the device information to the job management service 60.

In a case where the job is distributed to another printing company 10b (in a case where the printing company 10a having received the job does not perform printing), the billing service 80 registers withdrawal information from the printing company 10a that has transferred the job and deposit information to the printing company 10b that has received the job. In this case, the billing service 80 registers withdrawal information from the printing company 10b that has taken over the profile information (the printing company 10b that has taken over the job) from the printing company 10a and deposit information to the printing company 10a that has provided the profile information (the printing company 10a that has received the order for the job) with respect to the charge of the profile information. In this case, the billing for the profile information may be performed for an amount of money obtained by multiplying a unit price according to the number of pages, length, page area, coverage, or the like of the job. Alternatively, when the job is not distributed to another printing company 10b (when the printing company 10a who has received the order for the job performs printing), the billing service 80 registers the withdrawal information from the customer and the deposit information to the printing company 10 that has executed the job, in response to the completion notification of the job.

The profile management service 90 receives and manages profile information included in job information transmitted from the management server 11 of the printing company 10a. When the job management service 60 determines that the job information is to be distributed to the printing company 10b, the profile management service 90 encrypts profile information corresponding to the job information with a public key corresponding to the printing company 10b.

The outline of the operation of the device system 100 as described above is as follows. First, the printing machine 30 notifies the device management service 70 of device information such as configuration, setting, device state, and job state periodically or when there is a change. The device management service 70 holds the latest device information of the registered printing machine 30.

The management server 11 of the printing company 10a registers, in the job management service 60, job information including profile information of the printing company 10a that has determined to be unexecutable by its own printing machine 30. Since the job management service 60 holds the state of the printing machine 30 held by the registered printing company 10 (the state indicated by the above-described device information) and a list of accepted jobs, the job management service 60 can search for a printing company 10 that can execute a new requested job by a desired delivery date.

The job management service 60 searches for a printing machine 30 suitable for executing the job, and distributes the job information including the profile information to the printing company 10b having the printing machine 30. The printing machine 30 of the printing company 10b executes the job.

The billing service 80 withdraws money from the account of the printing company 10a and deposits money into the account of the printing company 10b based on the job completion notification notified from the printing machine 30 of the printing company 10b. Here, it is assumed that the fee for the job paid by the customer is deposited in the printing company 10a. Preferably, at least an information provision fee remains in the account of the printing company 10a. Further, the billing service 80 withdraws money from the account of the printing company 10b and deposits money into the account of the printing company 10a as a provision fee to the printing company 10b for the profile held by the printing company 10a. Note that a fee obtained by subtracting the provision fee of the profile from the fee for the job may be withdrawn from the account of the printing company 10a and deposited into the account of the printing company 10b.

With the above-described configuration, printing is performed using the printing machine 30 suitable for executing a job, and the operating rate of the printing machine 30 can be increased. Thus, profits can be distributed among the printing companies 10 that use the device system 100, while preventing opportunity loss. That is, the printing company 10a can sell a job that cannot be executed by the printing company 10a to another printing company 10b that can execute the job and can receive an information provision fee. The printing company 10b can increase the operation rate of the printing machine 30, and a customer who requests the printing has an advantage that a waiting time until completion of printing is shortened. Furthermore, since profile information, which is color setting information of the printing company 10a that has received a job, is distributed to another company, printing can be performed with the same quality even by another company.

Color Profile

Figure 2:
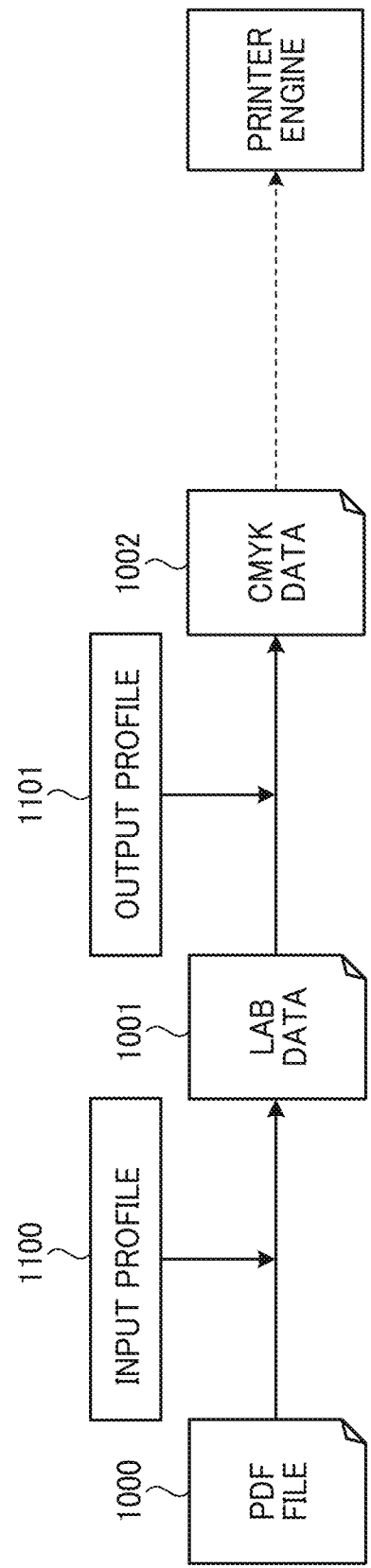
FIG. 2 is a diagram illustrating the function of the color profile, according to an embodiment of the present disclosure.

FIG. 2 is a diagram illustrating the function of the color profile. The function of the color profile is described below with reference to FIG. 2.

The color profile is color conversion data for performing uniform color reproduction among devices manufactured by various manufacturers, such as cameras, displays, printers, and scanners. Since each manufacturer operates in accordance with the International Color Consortium (ICC) profile that is a color profile, uniform color reproduction can be achieved even if the manufacturer or the apparatus is different.

For example, as illustrated in FIG. 2, RGB (red, green, blue) data defined in a portable document format (PDF) file 1000 created by an input device such as a camera or a scanner is converted into LAB data 1001 in an L*a*b* color space that is a device-independent color space by an input profile 1100 that is a profile on the input device side. In an output device such as a printer, the LAB data 1001 is converted into CMYK data 1002 for performing uniform color reproduction in each output device by an output profile 1101 that is a profile on the output device side, and is output. When the CMYK data 1002 is printed out by the printer, the same colors as those of the data created by the original input device are reproduced.

Among the profiles as described above, the input profile can be created based on the know-how of each printing company 10 depending on a recording medium such as paper, ink, and the like in order to achieve a characteristic print output. Examples of the mode of the characteristic print output include clear output of a blue component, clear output of a green component, correct expression of the color of a logo of a specific company or the color of a national flag, output suitable for special ink (transparent ink, fluorescent ink, metallic ink, or the like), and output suitable for special paper.

In the device system 100 according to the present embodiment, it is assumed that a profile transmitted from a specific printing company 10 to the cloud system 50 together with job information is an input profile. The profile transmitted to the cloud system 50 is not limited to the input profile and the output profile may be transmitted to the cloud system 50. In this case, for example, when the printing machines 30 of the same model are used by a plurality of printing companies 10, the output profile of a specific printing company 10 can be applied by another printing company 10.

Hardware Configuration of Management Server and Cloud System

Figure 3:
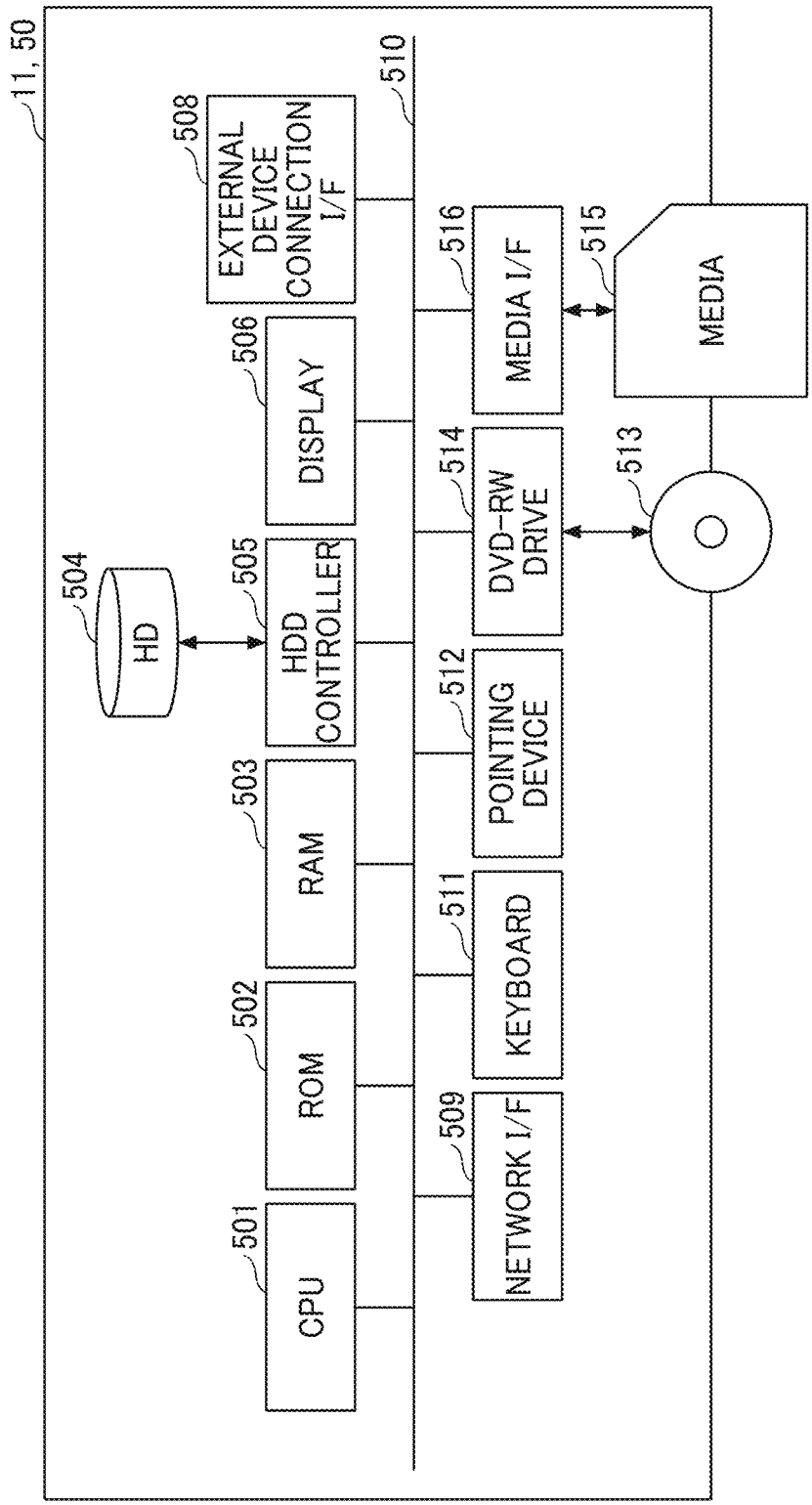
FIG. 3 is a diagram illustrating a hardware configuration of the management server and the cloud system, according to an embodiment of the present disclosure.

FIG. 3 is a diagram illustrating a hardware configuration of the management server and the cloud system, according to an embodiment of the present disclosure. Hardware configurations of the management server 11 and the cloud system 50 are described below with reference to FIG. 3. Specifically, a hardware configuration of the management server 11 and an information processing apparatus configuring the cloud system 50 are described.

As illustrated in FIG. 3, the information processing apparatus includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a keyboard 511, a pointing device 512, a digital versatile disc-rewritable (DVD-RW) drive 514, and a media I/F 516. These devices are connected to each other by a bus line 510 such as an address bus and a data bus to enable data communication.

The CPU 501 is a computing device that controls the operation of the entire information processing apparatus. The ROM 502 is a nonvolatile storage device that stores a program used for driving the CPU 501, such as an initial program loader (IPL). The RAM 503 is a volatile storage device used as a working area of the CPU 501.

The HD 504 is a non-volatile auxiliary storage device that stores various programs. The HDD controller 505 is a controller that controls reading or writing of various types of information from or to the HD 504 under the control of the CPU 501.

The display 506 is a display device that displays various types of information such as a cursor, a menu, a window, characters, and an image. The external device connection I/F 508 is an interface for connecting various external devices. In this case, examples of the external devices include a universal serial bus (USB) memory and a printer. The network I/F 509 is an interface for performing data communication via the network N, and is an interface capable of performing communication conforming to, for example, Ethernet (registered trademark) or Transmission Control Protocol (TCP)/Internet Protocol (IP).

The keyboard 511 is an input device including a plurality of keys for inputting characters, numerical values, various instructions, and the like. The pointing device 512 is an input device such as a mouse for selecting and executing various instructions, selecting a processing object, moving a cursor, and the like.

The DVD-RW drive 514 is a device that controls reading and writing of various types of information from and to a DVD 513 such as a digital versatile disc-recordable (DVD-R) or a DVD-RW as an example of a removable recording medium. The media I/F 516 is an interface that controls reading or writing (storing) of information from or to a medium 515 such as a flash memory.

The cloud system 50 is often implemented by a virtual machine. A virtual machine refers to an information processing apparatus in a case where another operating system (OS) runs on a host OS.

In addition, the hardware configuration of the information processing apparatus configuring each of the management server 11 and the cloud system 50 illustrated in FIG. 3 is an example. In other embodiments, the hardware configuration is not necessary to include all of the components illustrated in FIG. 3 or may include other components. It is needless to say that the information processing apparatuses constituting the management server 11 and the cloud system 50 do not need to have the same hardware configuration.

Hardware Configuration of Printing Machine

Figure 4:
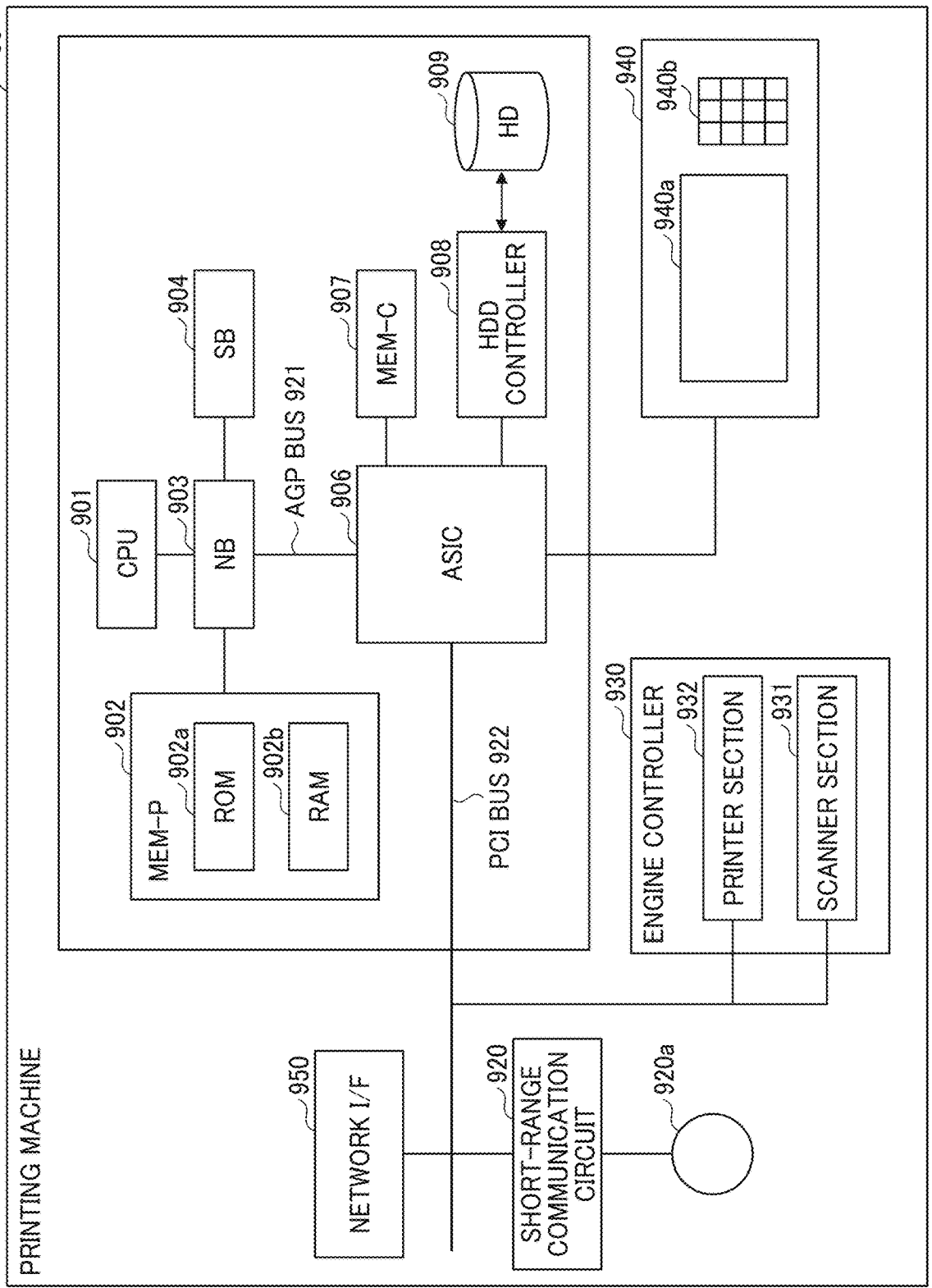
FIG. 4 is a diagram illustrating a hardware configuration of a printing machine according to an embodiment of the present disclosure.

FIG. 4 is a diagram illustrating an example of a hardware configuration of the printing machine. A hardware configuration of the printing machine 30 is described below with reference to FIG. 4.

As illustrated in FIG. 4, the printing machine 30 includes a controller 910, a short-range communication circuit 920, an engine controller 930, an operation panel 940, and a network I/F 950.

The controller 910 includes an CPU 901 that is a main part of a computer, a system memory (MEM-P) 902, a northbridge (NB) 903, a southbridge (SB) 904, an application specific integrated circuit (ASIC) 906, a local memory (MEM-C) 907, an HDD controller 908, and an HD 909. The NB 903 and the ASIC 906 are connected by an accelerated graphics port (AGP) bus 921.

The CPU 901 is a computing device that performs overall control of the printing machine 30. The NB 903 is a bridge for connecting the CPU 901 to the MEM-P 902, the SB 904, and the AGP bus 921, and includes a memory controller that controls reading and writing with respect to the MEM-P 902, a peripheral component interconnect (PCI) master, and an AGP target.

The MEM-P 902 includes a ROM 902*a* that is a memory for storing programs and data for implementing functions of the controller 910, and a RAM 902*b* that is used as a memory for drawing at the time of developing programs and data and memory printing. The program stored in the ROM 902*a* may be recorded and provided in a computer-readable recording medium such as a compact disc read only memory (CD-ROM), a compact disc recordable (CD-R), or a digital versatile disc (DVD) as a file in an installable format or an executable format.

The SB 904 is a bridge for connecting the NB 903 to PCI devices, peripheral devices, and the like. The ASIC 906 is an integrated circuit (IC) for use in image processing having hardware elements for image processing, and serves as a bridge for connecting the AGP bus 921, the PCI bus 922, the HDD controller 908, and the MEM-C 907. The ASIC 906 includes a PCI target and an AGP master, an arbiter (ARB) that is the core of the ASIC 906, a memory controller that controls the MEM-C 907, a plurality of direct memory access controllers (DMACs) that perform, for example, rotation of image data using hardware logic and the like, and a PCI unit that performs data transfer between the scanner section 931 and the printer section 932 via the PCI bus 922. Note that a universal serial bus (USB) interface or an institute of Electrical and Electronics Engineers (IEEE) 1394 interface may be connected to the ASIC 906.

The MEM-C 907 is a local memory used as an image buffer for copying and a code buffer. The HD 909 is a storage for storing image data, fonts used for printing, and forms. The HDD controller 908 is a controller that controls reading or writing from or to the CPU 901 under the control of the HD 909.

The AGP bus 921 is a bus interface for a graphics accelerator card, which has been proposed to speed up graphics processing, and can speed up the graphics accelerator card by directly accessing the MEM P902 with high throughput.

The short-range communication circuit 920 is a communication circuit such as Near Field Communication (NFC) or Bluetooth (registered trademark). The short-range communication circuit 920 is electrically connected to the ASIC 906 via the PCI bus 922. An antenna 920*a* for wireless communication is connected to the short-range communication circuit 920.

The engine controller 930 includes a scanner section 931 and a printer section 932. The scanner section 931 and the printer section 932 include an image processing function such as error diffusion or gamma conversion.

The operation panel 940 includes a screen display unit 940*a* and a hard key 940*b*. The screen display unit 940*a* such as a touch screen displays current setting values or a selection screen and receives an input from a user. The hard key 940*b* includes a numeric keypad that receives setting values of conditions related to image formation such as density setting conditions and a start key that receives a copy start instruction.

The printing machine 30 can sequentially switch and select a document box function, a copy function, a printer function, and a fax function by using an application switching key of the operation panel 940. A document box mode is selected when the document box function is selected, a copy mode is selected when the copy function is selected, a printer mode is selected when the printer function is selected, and a fax mode is selected when the fax function is selected.

The network I/F 950 is an interface for performing data communication via the network N, and is, for example, an interface capable of performing communication conforming to Ethernet, TCP/IP, or the like. The network I/F 950 is electrically connected to the ASIC 906 via the PCI bus 922.

Note that the hardware configuration of the information processing apparatus configuring the printing machine 30 illustrated in FIG. 4 is an example. In other embodiments, the hardware configuration is not necessary to include all of the components illustrated in FIG. 4 or may include other components.

Configuration and Operation of Functional Blocks of Device System

Figure 5:
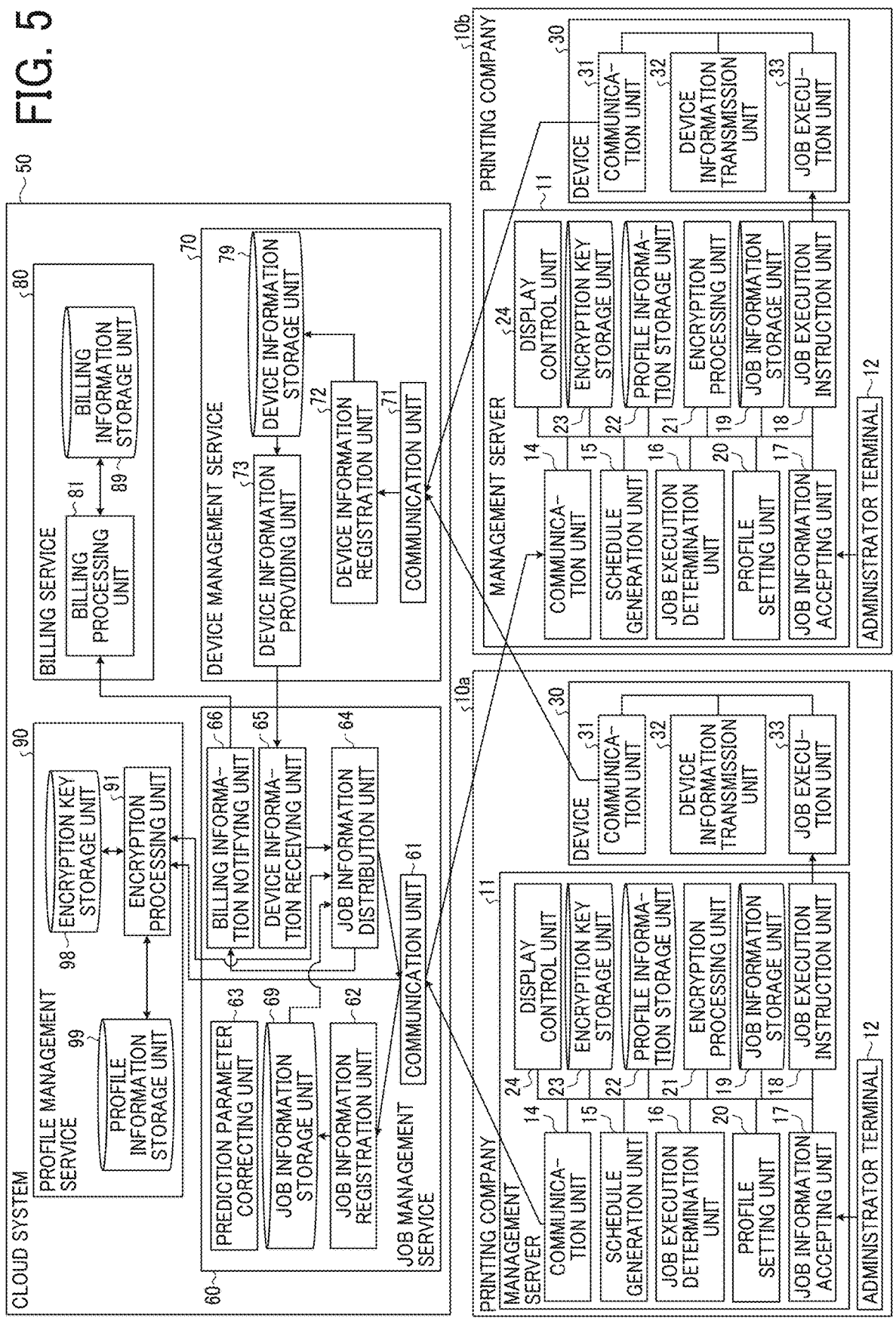
FIG. 5 is a diagram illustrating an example of a configuration of functional blocks of the device system according to the first embodiment of the present disclosure.

FIG. 5 is a diagram illustrating an example of a configuration of functional blocks of the device system according to the first embodiment of the present disclosure. The configuration and operations of functional blocks of the device system 100 are described below with reference to FIG. 5.

Management Server

As illustrated in FIG. 5, the management server 11 of the printing company 10 includes a communication unit 14, a schedule generation unit 15, a job execution determination unit 16, a job information accepting unit 17, a job execution instruction unit 18, a job information storage unit 19, a profile setting unit 20, an encryption processing unit 21, a profile information storage unit 22, an encryption key storage unit 23, and a display control unit 24.

The job information accepting unit 17 is a functional unit that accepts registration of job information from the administrator terminal 12. At this time, the job information accepting unit 17 incorporates the profile information set by the profile setting unit 20 into the job information and accepts the job information including the profile information. The content of the job information is described below in the cloud system 50. Note that the job information accepting unit 17 may accept job information manually from the printing company 10 or via a storage medium.

The profile setting unit 20 is a functional unit that sets profile information to be associated with job information to be registered in accordance with an operation on the administrator terminal 12. The profile information set by the profile setting unit 20 is included in the job information when the job information accepting unit 17 accepts the job information. Here, the profile information is information related to a color profile (here, an input profile) used when print output is performed based on the job information, and includes, for example, information of a name of the profile, a description of the profile, paper, ink, a profile main body (conversion table), an expiration date, an upper limit number of uses, and a usage fee. The profile information is stored and managed in the profile information storage unit 22.

The job execution determination unit 16 is a functional unit that determines whether the job received by the job information accepting unit 17 is to be executed by the printing company 10 (i.e., to be printed by the printing machine 30 of the printing company 10) or to be transmitted to the cloud system 50. For example, the job execution determination unit 16 predicts the state of the printing machine 30 at the start of the idle time from the current state of the printing machine 30 and the schedule information scheduled to execute the job, and determines whether the newly accepted job can be completed by the end of the idle time. The job execution determination unit 16 applies the profile information set by the profile setting unit 20 to the job information accepted by the job information accepting unit 17, and determines whether print output of the printing machine 30 is executable. For example, the job execution determination unit 16 determines whether the printing machine 30 is compatible with ink and paper specified in the profile information. When the job execution determination unit 16 determines that the job cannot be executed by the printing company 10, the job execution determination unit 16 determines that the job is to be transmitted to the cloud system 50 in order to request execution by another printing company 10.

The schedule generation unit 15 is a functional unit that generates schedule information and stores the schedule information in the job information storage unit 19 when the job execution determination unit 16 determines that the job can be executed by the printing company 10. Although details of the schedule information are described below, the schedule information is information indicating a schedule of from when to when to execute a job.

The job execution instruction unit 18 is a functional unit that instructs the printing machine 30 to execute the job based on the schedule information generated by the schedule generation unit 15 when the job execution determination unit 16 determines that the job can be executed by the printing company 10.

The communication unit 14 is a functional unit that transmits and receives various types of information to and from the job management service 60. The communication unit 14 transmits job information (including profile information) registered by the administrator terminal 12 and an execution completion notification of a job to the job management service 60. The communication unit 14 is implemented, for example, by executing a program by the network I/F 509 and the CPU 501 illustrated in FIG. 3.

The job information storage unit 19 is a functional unit that stores job information accepted by the job information accepting unit 17. The job information storage unit 19 is implemented by at least one of the RAM 503 or the HD 504 illustrated in FIG. 3. The job information stored in the job information storage unit 19 is the same as job information of the job management service 60 described below.

The encryption processing unit 21 is a functional unit that encrypts at least the profile information included in the job information when the job execution determination unit 16 determines that the job information is to be transmitted to the cloud system 50. The encryption processing unit 21 performs encryption using, for example, the private key of the printing company 10 stored in the encryption key storage unit 23. The encryption processing unit 21 may encrypt the entire job information including the profile information. When job information from another printing company 10 distributed by the cloud system 50 is received by the communication unit 14, the encryption processing unit 21 decrypts the encrypted profile information included in the job information with the private key of the printing company 10 itself stored in the encryption key storage unit 23.

The profile information storage unit 22 is a functional unit that stores and manages profile information of various profiles. The profile information stored in the profile information storage unit 22 is referred to when the profile setting unit 20 associates the profile information with the job information. The profile information storage unit 22 is implemented by at least one of the RAM 503 or the HD 504 illustrated in FIG. 3.

The encryption key storage unit 23 is a functional unit that stores a private key used by the printing company 10 on its own. The encryption key storage unit 23 is implemented by, for example, the ROM 502 illustrated in FIG. 3. The encryption key storage unit 23 may be implemented by a secure storage medium such as a trusted platform module (TPM). Thus, the private key used for encrypting and decrypting data can be safely managed.

The display control unit 24 is a functional unit that, in order for the management server 11 to function as a Web server for the administrator terminal 12, transmits various types of screen data presented by a Web page to the administrator terminal 12 in response to an operation on the administrator terminal 12 and controls a display operation on the administrator terminal 12.

The schedule generation unit 15, the job execution determination unit 16, the job information accepting unit 17, the job execution instruction unit 18, the profile setting unit 20, the encryption processing unit 21, and the display control unit 24 described above are implemented by, for example, the CPU 501 illustrated in FIG. 3 executing programs. Some or all of these functional units may be implemented by an integrated circuit(s) such as an FPGA(s) or an ASIC(s), instead of a program(s) that is software.

Each functional unit of the management server 11 illustrated in FIG. 5 conceptually illustrates a function, and is not limited to such a configuration. For example, a plurality of functional units illustrated as independent functional units in the management server 11 illustrated in FIG. 5 may be configured as one functional unit. On the other hand, in the management server 11 illustrated in FIG. 5, a function of one functional unit may be divided into a plurality of functional units.

Printing Machine

As illustrated in FIG. 5, the printing machine 30 of the printing company 10 includes a communication unit 31, a device information transmission unit 32, and a job execution unit 33.

The job execution unit 33 is a functional unit that executes a job in response to a job execution instruction from the job execution instruction unit 18. For example, the job execution unit 33 causes the printer section 932 to print out the print data included in the job information on a recording medium such as a sheet of paper by using the profile of the profile information included in the job information.

The device information transmission unit 32 is a functional unit that transmits device information related to the printing machine 30 to the device management service 70 via the communication unit 31. The device information includes, for example, a configuration such as a printing speed of the printing machine 30, settings such as sheet type and size, a state of the printing machine 30 such as an operating state or a failure state, and schedule information indicating how many jobs are input. The content of the device information will be described below in the cloud system 50.

The communication unit 31 is a functional unit that transmits and receives various types of information to and from the device management service 70. For example, the communication unit 31 transmits the device information to the device management service 70 under the control of the device information transmission unit 32. The communication unit 31 is implemented by executing a program by, for example, the network I/F 950 and the CPU 901 illustrated in FIG. 4.

The device information transmission unit 32 and the job execution unit 33 described above are implemented, for example, by executing a program by the CPU 901 illustrated in FIG. 4. Some or all of these functional units may be implemented by an integrated circuit(s) such as an FPGA(s) or an ASIC(s), instead of a program(s) that is software.

Each functional unit of the printing machine 30 illustrated in FIG. 5 conceptually illustrates a function, and is not limited to such a configuration. For example, a plurality of functional units illustrated as independent functional units in the printing machine 30 illustrated in FIG. 5 may be configured as one functional unit. On the other hand, in the printing machine 30 illustrated in FIG. 5, the functions of one functional unit may be divided into a plurality of functional units.

Job Management Service

As illustrated in FIG. 5, the job management service 60 of the cloud system 50 includes a communication unit 61 (an example of an acquisition unit), a job information registration unit 62, a prediction parameter correcting unit 63, a job information distribution unit 64 (an example of a distribution unit), a device information receiving unit 65, a billing information notifying unit 66, and a job information storage unit 69.

The communication unit 61 is a functional unit that transmits and receives various types of information to and from the management server 11 of the printing company 10. For example, the communication unit 61 receives job information including profile information from the management server 11. Further, the communication unit 61 transmits job information and schedule information to the management server 11. The communication unit 61 also receives a job execution completion notification from the management server 11. The communication unit 61 is implemented, for example, by executing a program by the network I/F 509 and the CPU 501 illustrated in FIG. 3.

The job information registration unit 62 is a functional unit that stores and registers the job information received by the communication unit 61 in the job information storage unit 69. In this case, the job information registration unit 62 registers information other than the encrypted profile information in the job information in the job information storage unit 69. The encrypted profile information is transmitted to the encryption processing unit 91 as is described below. An example of job information stored in the job information storage unit 69 is illustrated in Table 1 below.

TABLE 1

| Job information | | | | |
|---|---|---|---|---|
| Job ID | Sheet of Paper | Number of Sheets | Image Quality Request | Desired Delivery Date |
| J001 | Gross paper | 500 | High quality | 20xx/MM/DD hh:mm |
| J002 | Plain paper | 700 | Medium quality | 20xx/MM/DD hh:mm |
| Print Data | Customer Information | Schedule Information | Log | Profile Information |
| ***.data | Customer A | K001 20xx/MM/DD hh:mm | hh:mm to hh:mm | Blue color profile Gross paper Normal ink |

TABLE 1-continued

| | | Job information | | |
|---|---|---|---|---|
| ***.data | Customer B | K001<br>20xx/MM/DD<br>hh:mm | hh:mm to<br>hh:mm | Green color profile<br>Plain paper<br>Normal ink |

The job information distribution unit 64 is a functional unit that determines a printing machine 30 that can execute a job by referring to newly registered job information, profile information corresponding to the job information, existing job information and schedule information, and device information received from the device management service 70. In this case, the job information distribution unit 64 may receive profile information in an unencrypted state from the profile management service 90. The job information distribution unit 64 also generates schedule information related to a job to be distributed to the determined printing machine 30. In addition, the job information distribution unit 64 transmits job information including profile information and schedule information to the management server 11 of the printing company 10 having the determined printing machine 30 via the communication unit 61. The job information distribution unit 64 stores the schedule information in the job information storage unit 69 in association with the job information.

The device information receiving unit 65 is a functional unit that receives device information from the device management service 70. The device management service 70 may transmit the device information to the job management service 60 each time new device information is received, or may transmit the device information to the job management service 60 periodically or when the load is small. Alternatively, the device information receiving unit 65 may request the device management service 70 for device information and receive the device information as a result of the request. In this case, the device information receiving unit 65 may also request device information periodically or when the load is small.

The billing information notifying unit 66 is a functional unit that, when another printing company 10b executes a job registered by a specific printing company 10a, notifies the billing service 80 of withdrawal information of the specific printing company 10a and deposit information to the other printing company 10b. This is because the other printing company 10b receives at least a part of the fee received from the customer by the specific printing company 10a. However, an information provision fee remains for the specific printing company 10a. The billing information notifying unit 66 notifies the billing service 80 of the withdrawal information of the profile fee from the other printing company 10b having received the profile information (i.e., the other printing company 10b who received from the specific printing company 10a and executed the job) and of the deposit information of the profile fee from the printing company 10b to the specific printing company 10a having provided the profile information (i.e., the specific printing company 10a who received the order of the job). Note that the fee of the profile information in this case may be included in the information provision fee described above. The timing of the notification by the billing information notifying unit 66 may be the timing at which the other printing company 10b completes the execution of the job, or may be the timing at which the job is transmitted to the other printing company 10b.

The prediction parameter correcting unit 63 is a functional unit that receives a job execution completion notification from the management server 11 after execution of a job, accumulates the job execution completion notification, and corrects a prediction parameter based on a past execution result. Here, the prediction parameter is a parameter for predicting a preparation time, an execution time, and the like of a job from job information, device information, and the like.

The job information storage unit 69 is a functional unit that stores job information as illustrated in Table 1 above. The job information storage unit 69 is implemented by at least one of the RAM 503 or the HD 504 illustrated in FIG. 3. As illustrated in Table 1, the job information includes, for example, a job ID, a sheet of paper, the number of sheets, an image quality request, a desired delivery date, print data, customer information, schedule information, a log, and profile information. The job ID is identification information for identifying the job information. The sheet of paper is the grade and type of sheet of paper required for this job. The number of sheets is the number of copies to be printed in the job. The image quality request is an image quality (for example, resolution) required for a printed matter. The desired delivery date is a delivery date of the printed matter desired by the customer. The print data is data to be printed and includes, for example, JDF and PDL. The customer information is information for specifying a customer who has requested the job. The schedule information is information indicating when the printing machine 30 to which the job is assigned (K001 represents the printing machine 30) starts and ends execution of the job. The log includes a start time and an end time at which the job is actually executed, and is also included in the job execution completion notification. Here, the profile information is information related to a color profile (here, an input profile) used when print output is performed based on the job information, and detailed contents thereof are as described above.

The job information registration unit 62, the prediction parameter correcting unit 63, the job information distribution unit 64, the device information receiving unit 65, and the billing information notifying unit 66 described above are implemented by, for example, the CPU 501 illustrated in FIG. 3 executing programs. Some or all of these functional units may be implemented by an integrated circuit(s) such as an FPGA(s) or an ASIC(s), instead of a program(s) that is software.

Each functional unit of the job management service 60 illustrated in FIG. 5 conceptually illustrates a function, and is not limited to such a configuration. For example, a plurality of functional units illustrated as independent functional units in the job management service 60 illustrated in FIG. 5 may be configured as one functional unit. On the other hand, in the job management service 60 illustrated in FIG. 5, a function of one functional unit may be divided into a plurality of functional units.

Device Management Service

As illustrated in FIG. 5, the device management service 70 of the cloud system 50 includes a communication unit 71, a device information registration unit 72, a device information providing unit 73, and a device information storage unit 79.

The communication unit 71 is a functional unit that transmits and receives various types of information to and from the printing machine 30 of the printing company 10. For example, the communication unit 71 receives device information from the printing machine 30. When starting communication, the communication unit 71 uses a bidirectional communication mechanism (for example, WebSocket or Message Queuing Telemetry Transport (MQTT)). The communication unit 71 is implemented, for example, by executing a program by the network I/F 509 and the CPU 501 illustrated in FIG. 3.

The device information registration unit 72 is a functional unit that registers device information received via the communication unit 71 in the device information storage unit 79. An example of device information registered in the device information storage unit 79 is illustrated in Table 2 below.

TABLE 2

Device Information

| Device ID | Configuration | Setting | Device State |
|---|---|---|---|
| K001 | Color: M sheets/min Monochrome: N sheets/min | Roll A-01 | In operation |
| K002 | Color: M sheets/min Monochrome: N sheets/min | Roll B-03 | Idle state |

| Remaining Amount of Sheets | Ink | Remaining Amount of Ink | Job State (Schedule Information) |
|---|---|---|---|
| N [m] | Color ink | V [l] | 20xx/MM/DD hh:mm to hh:mm |
| . | . | . | . |
| N [m] | Special ink | V [l] | 20xx/MM/DD hh:mm to hh:mm |
| . | . | . | . |

The device information providing unit 73 is a functional unit that provides the job management service 60 with the device information registered in the device information storage unit 79. It is desirable that the device information providing unit 73 provides device information without delay when new device information is registered. Alternatively, the device information providing unit 73 may provide device information in response to a request from the device information receiving unit 65 of the job management service 60, or may provide device information periodically or at a timing when the load is small.

The device information storage unit 79 is a functional unit that stores device information as illustrated in Table 2 described above. The device information storage unit 79 is implemented by at least one of the RAM 503 or the HD 504 illustrated in FIG. 3. As illustrated in Table 2, the device information is information including, for example, a device ID, a configuration, a setting, a device state, a sheet remaining amount, ink, an ink remaining amount, and a job state. The device ID is identification information for uniquely identifying the printing machine 30. The configuration is information relating to the functions of the printing machine 30, and includes, for example, whether color printing and monochrome printing are possible, the printing speed when possible, and the like. The settings include the size, type, and grade of the sheet of paper set in the printing machine 30. The device state represents the current state of the printing machine 30, such as operating, stopped, or malfunctioning. The sheet remaining amount is a remaining amount of sheet of paper. The ink is a type of ink mounted, such as color ink, transparent ink, fluorescent ink, or metallic ink. The ink remaining amount is a remaining amount of ink. The job status is information related to a job input to the printing machine 30, and includes, for example, schedule information.

The device information registration unit 72 and the device information providing unit 73 described above are implemented by, for example, programs executed by the CPU 501 illustrated in FIG. 3. Some or all of these functional units may be implemented by an integrated circuit(s) such as an FPGA(s) or an ASIC(s), instead of a program(s) that is software.

Each functional unit of the device management service 70 illustrated in FIG. 5 conceptually illustrates a function, and is not limited to such a configuration. For example, a plurality of functional units illustrated as independent functional units in the device management service 70 illustrated in FIG. 5 may be configured as one functional unit. On the other hand, in the device management service 70 illustrated in FIG. 5, a function of one functional unit may be divided into a plurality of functional units.

Billing Service

The billing service 80 of the cloud system 50 includes a billing processing unit 81 and a billing information storage unit 89.

The billing processing unit 81 is a functional unit that registers withdrawal information and deposit information of each printing company 10 in the billing information storage unit 89, and requests a banking system corresponding to the bank account of each printing company 10 to perform transfer processing based on those information. The banking system performs a transfer process between bank accounts on the due date.

The billing information storage unit 89 is a functional unit that stores withdrawal information and deposit information of each printing company 10. The billing information storage unit 89 is implemented by at least one of the RAM 503 or the HD 504 illustrated in FIG. 3.

The above-described billing processing unit 81 is implemented, for example, by executing a program by the CPU 501 illustrated in FIG. 3. Note that the billing processing unit 81 may be implemented by an integrated circuit such as an FPGA or an ASIC instead of a program that is software.

Note that each functional unit of the billing service 80 illustrated in FIG. 5 conceptually illustrates a function, and is not limited to such a configuration. For example, a plurality of functional units illustrated as independent functional units in the billing service 80 illustrated in FIG. 5 may be configured as one functional unit. On the other hand, in the billing service 80 illustrated in FIG. 5, the functions of one functional unit may be divided into a plurality of functional units.

Profile Management Service

The profile management service 90 of the cloud system 50 includes the encryption processing unit 91, the encryption key storage unit 98, and the profile information storage unit 99 (serving as a storage unit).

The encryption processing unit 91 is a functional unit that receives the encrypted profile information included in the job information received by the communication unit 61 of the job management service 60 and decrypts the profile information with the public key stored in the encryption key storage unit 98 corresponding to the printing company 10 that is the transmission source of the job information. The encryption processing unit 91 stores the decrypted profile information in the profile information storage unit 99. The function of storing and managing the profile information in the profile information storage unit 99 by the encryption processing unit 91 corresponds to a "management unit" according to an embodiment of the present disclosure. When a printing machine 30 that can execute a job is determined by the job information distribution unit 64, the encryption processing unit 91 encrypts profile information corresponding to the job with a public key stored in the encryption key storage unit 98 corresponding to the printing company 10 having the printing machine 30 and transmits the encrypted profile information to the job information distribution unit 64 in response to a request from the job information distribution unit 64.

The encryption processing unit 91 may store the profile information in the profile information storage unit 99 in the encrypted state before the profile information is decrypted. In this case, when a printing machine 30 that can execute a job is determined by the job information distribution unit 64, the encryption processing unit 91 may once decrypt profile information corresponding to the job using a public key corresponding to a printing company 10 that is a transmission source of the job, re-encrypt the profile information using a public key corresponding to another printing company 10 that is a transmission destination, and transmit the profile information to the job information distribution unit 64. As a result, the management of profile information in the profile information storage unit 99 can be performed in an encrypted state, so that the security of information management can be enhanced.

The encryption key storage unit 98 is a functional unit that stores a public key of each printing company 10. The encryption key storage unit 98 is implemented by at least one of the RAM 503 or the HD 504 illustrated in FIG. 3.

The profile information storage unit 99 is a functional unit that stores profile information of job information received by the job management service 60. As described above, the profile information stored in the profile information storage unit 99 may be stored after being decrypted with the public key of the transmission source of the job information, or may be stored in an encrypted state without being decrypted. The profile information storage unit 99 is implemented by at least one of the RAM 503 or the HD 504 illustrated in FIG. 3.

The encryption processing unit 91 is implemented, for example, by executing a program by the CPU 501 illustrated in FIG. 3. Note that the encryption processing unit 91 may be implemented by an integrated circuit such as an FPGA or an ASIC instead of a program that is software.

Each functional unit of the profile management service 90 illustrated in FIG. 5 conceptually illustrates a function, and is not limited to such a configuration. For example, a plurality of functional units illustrated as independent functional units in the profile management service 90 illustrated in FIG. 5 may be configured as one functional unit. On the other hand, in the profile management service 90 illustrated in FIG. 5, a function of one functional unit may be divided into a plurality of functional units.

Data Model

Figure 6:
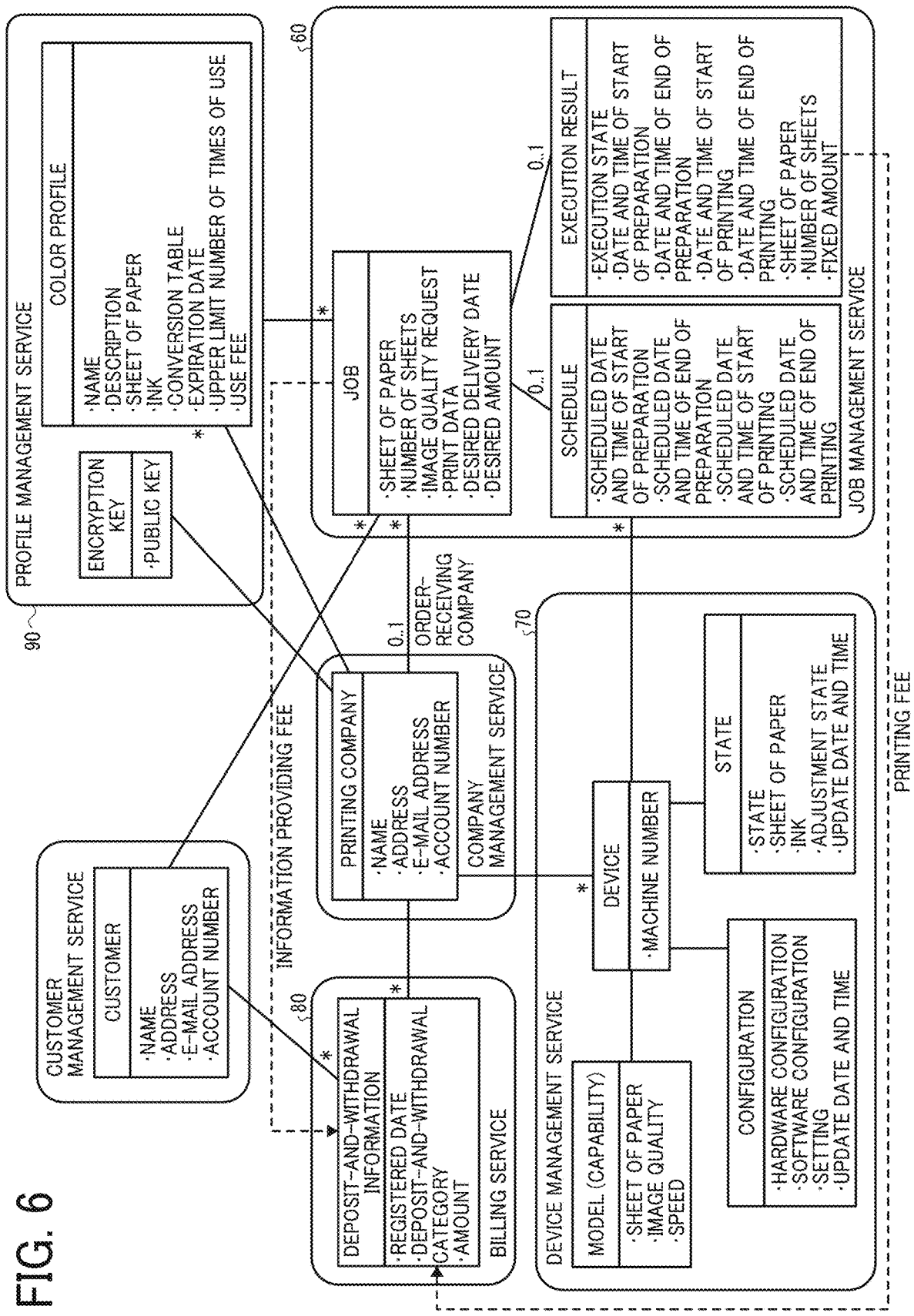
FIG. 6 is a diagram illustrating an example of a data model used in the device system according to the first embodiment of the present disclosure.

FIG. 6 is a diagram illustrating an example of a data model used in the device system according to the first embodiment of the present disclosure. The data model used in the device system 100 according to the present embodiment is described below with reference to FIG. 6. Each piece of information has an identifier (for example, a job ID). In addition, an identifier (for example, a customer ID or a printing company ID in deposit and withdrawal information) of data of a destination connected by the related line is also included.

Customer Management Service

The customer management service has the following information about the customer. The customer management service may be included in the cloud system 50.

Name
Address
E-mail address
Account number (bank account)

Billing Service

The billing service 80 has the following deposit-and-withdrawal information (withdrawal information and deposit information stored in the billing information storage unit 89).

Registration date
Deposit/withdrawal category
Amount

The deposit-and-withdrawal information is generated when a job is provided to another printing company 10. The deposit/withdrawal classification of a providing source is withdrawal, and the deposit/withdrawal classification of a providing destination is deposit.

Company Management Service

The company management service has the following information about the printing company 10. The company management service may be included in the cloud system 50.

Name
Address
E-mail address
Account number (bank account)

Device Management Service

As described above, the printing machine 30 transmits the device information to the device management service 70 periodically or at a timing when the device information changes. The device management service 70 includes the following information related to model (information stored in the device information storage unit 79).

Sheet of paper
Image quality
Speed

The device management service 70 also has the following information related to the printing machine 30 (information stored in the device information storage unit 79).

Machine number

The device management service 70 further includes the following information related to the configuration (information stored in the device information storage unit 79).

Hardware Configuration
Software configuration
Settings
Update date and time

The device management service 70 further includes the following information related to state (information stored in the device information storage unit 79).

State (standby, ready, printing, stopped, error, etc.)
Sheet of paper (sheet type, remaining amount, etc.)
Ink (ink type, remaining amount, etc.)
Adjustment state (alignment, color tone, etc.)
Update date and time Job Management Service The job management service 60 includes the following information related to job (information stored in the job information storage unit 69).

Sheet of paper
Number of sheets
Image quality request
Print data
Desired delivery date
Desired amount The desired amount (price) may be set, for example, as a customer request when the sales representative provides a job to another printing company 10, or as a request when the customer registers a job.

The job management service 60 further has the following information related to schedule (information stored in the job information storage unit 69).

Scheduled date and time of start of preparation
Scheduled date and time of end of preparation
Scheduled date and time of start of printing
Scheduled date and time of end of printing The job management service 60 also has the following information related to execution results (information transmitted in the job execution completion notification).

Execution state
Date and time of start of preparation
Date and time of end of preparation
Scheduled date and time of start of printing
Scheduled date and time of end of printing
Sheet of paper
Number of sheets
Fixed amount The job execution completion notification is generated when the execution of the job is completed.

Profile Management Service

The profile management service 90 has information about the following color profiles (information stored in the profile information storage unit 99).

Name
Description
Sheet of paper
Ink
Conversion table
Expiration date
Upper limit number of uses
Usage fee The profile management service 90 also has the following information on encryption key (information stored in the encryption key storage unit 98). Note that the information about the encryption key may be stored in the company management service so as to be used for purposes other than profile encryption.

Public key

Overall Process of Device System

Figure 7:
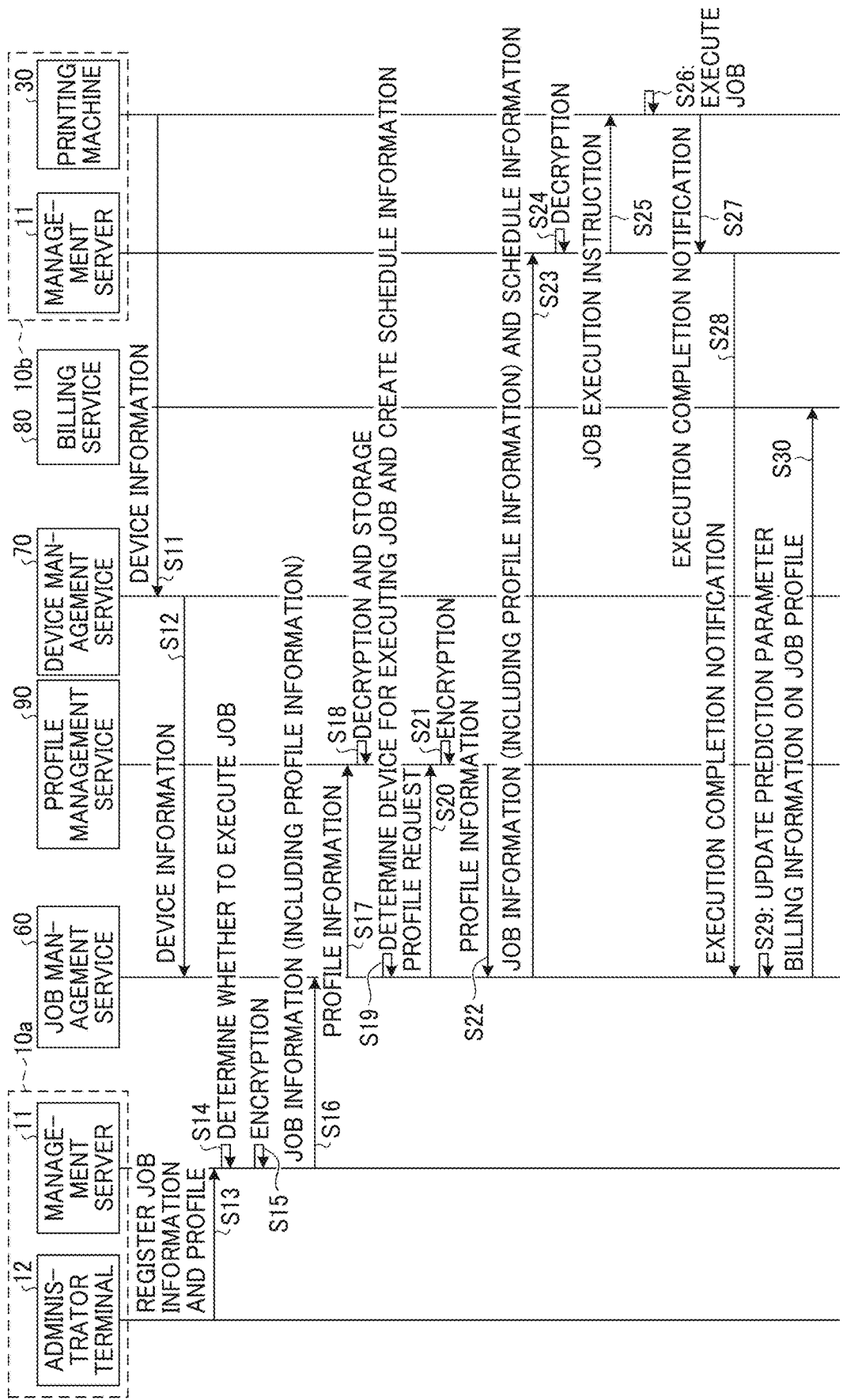
FIG. 7 is a sequence diagram illustrating an overall process of the device system according to an embodiment of the present disclosure.

FIG. 7 is a sequence diagram illustrating an overall process of the device system according to an embodiment of the present disclosure. FIG. 8 is a diagram illustrating an example of a job registration screen. The overall process of the device system 100 according to the present embodiment is described below with reference to FIGS. 7 and 8. In FIG. 7, it is assumed that the printing company 10 that registers the job is a printing company 10*a*. When a plurality of devices that can execute a job exist in the printing company 10*a* at the time of registration on the job registration screen, a selection screen may be displayed on which one or more specific devices can be selected from among the plurality of devices.

Step S11

The device information transmission unit 32 of the printing machine 30 of each printing company 10 (for example, the printing company 10*b*) transmits device information related to the printing machine 30 to the device management service 70 via the communication unit 31.

Step S12

The device information registration unit 72 of the device management service 70 registers the device information received via the communication unit 71 in the device information storage unit 79. Next, the device information providing unit 73 of the device management service 70 provides the job management service 60 with the device information registered in the device information storage unit 79. The device information receiving unit 65 of the job management service 60 receives the device information from the device management service 70.

Step S13

The administrator terminal 12 of the printing company 10*a* displays a job registration screen 2000 for registering a job as illustrated in FIG. 8 on its own display device in accordance with the operation of the printing company 10*a*. The administrator terminal 12 sets a profile to be applied to the job and registers the job on the job registration screen 2000.

As illustrated in FIG. 8, the job registration screen 2000 includes a customer selection section 2001, a file selection section 2002, a copy number input section 2003, a sheet selection section 2004, a profile selection section 2005, and a registration key 2011.

The customer selection section 2001 is an input area for selecting a customer who has made a print request (job) to the printing company 10*a*. The file selection section 2002 is an input area for selecting a file (print data) to be printed corresponding to the job of the customer selected by the customer selection section 2001. The copy number input section 2003 is an input area for inputting the number of copies to be printed for the file selected by the file selection section 2002. The sheet selection section 2004 is an input area for selecting a recording medium on which the file selected by the file selection section 2002 is printed. The profile selection section 2005 is an input area for selecting a profile to be applied when the file selected by the file selection section 2002 is printed out. The registration key 2011 is a key for registering a job.

Specifically, the profile setting unit 20 of the management server 11 sets the profile selected by the profile selection section 2005 and information related to the profile (e.g., profile name, profile description, sheet of paper, ink, expiration date, upper limit number of uses, and usage fee) as profile information for the print data included in the job information selected by the file selection section 2002 in accordance with an operation on the administrator terminal 12. When the registration key 2011 is pressed, the job information accepting unit 17 of the management server 11 receives the information input on the job registration screen 2000 as job information including the profile information set by the profile setting unit 20. The job information accepting unit 17 registers (stores) the received job information in the job information storage unit 19.

Step S14

The job execution determination unit 16 of the management server 11 determines whether the job received by the job information accepting unit 17 is to be executed by the printing company 10*a* (in other words, to be printed by the printing machine 30 of the printing company 10*a*) or to be transmitted to the cloud system 50. For example, the job execution determination unit 16 predicts the state of the printing machine 30 at the start of the idle time from the current state of the printing machine 30 and the schedule information scheduled to execute the job, and determines whether the newly accepted job can be completed by the end of the idle time. The job execution determination unit 16 applies the profile information set by the profile setting unit 20 to the job information accepted by the job information accepting unit 17, and determines whether print output of the printing machine 30 is executable.

When the job execution determination unit 16 determines that the job can be executed by the printing company 10a, the schedule generation unit 15 of the management server 11 generates schedule information and stores the schedule information in the job information storage unit 19. The job execution instruction unit 18 of the management server 11 instructs the printing machine 30 to execute the job based on the schedule information generated by the schedule generation unit 15.

Hereinafter, a case where the job execution determination unit 16 determines that the job cannot be executed by the printing company 10a is described.

Step S15

The encryption processing unit 21 of the management server 11 encrypts at least the profile information included in the job information when the job execution determination unit 16 determines that the job cannot be executed by the printing company 10a. At this time, the encryption processing unit 21 performs encryption using, for example, a private key (first private key) of the printing company 10a stored in the encryption key storage unit 23 (an example of encryption processing on profile information).

Step S16

The communication unit 14 of the management server 11 transmits job information including the encrypted profile information to the job management service 60. The communication unit 61 of the job management service 60 receives the job information.

Step S17

The communication unit 61 sends the encrypted profile information included in the received job information to the profile management service 90. The encryption processing unit 91 of the profile management service 90 receives the encrypted profile information.

Step S18

The encryption processing unit 91 decrypts the received, encrypted profile information using a public key (first public key) stored in the encryption key storage unit 98 corresponding to the printing company 10a that is the transmission source of the job information (an example of decryption processing on profile information). The encryption processing unit 91 stores the decrypted profile information in the profile information storage unit 99.

Step S19

The job information registration unit 62 of the job management service 60 stores and registers the job information received by the communication unit 61 in the job information storage unit 69. In this case, the job information registration unit 62 registers information other than the encrypted profile information in the job information in the job information storage unit 69. The job information distribution unit 64 of the job management service 60 refers to the newly registered job information, the profile information corresponding to the job information, the existing job information and schedule information, and the device information received from the device management service 70, and determines a printing machine 30 that can execute the job among the printing machines 30 of printing companies 10 other than the printing company 10a. Here, it is assumed that the job information distribution unit 64 determines a printing machine 30 of the printing company 10b as the printing machine 30 that can execute the job. The determination as to whether each printing machine 30 can execute a job and the determination as to which printing machine 30a job is to be distributed to when a plurality of printing machines 30 can execute the job may be the same as the determination as to whether a job can be executed by the job execution determination unit 16. The job information distribution unit 64 also generates schedule information related to a job to be distributed to the printing machine 30 of the determined printing company 10b.

Step S20

The encryption processing unit 91 of the profile management service 90 receives a profile request from the job information distribution unit 64 when the printing machine 30 of the printing company 10b that can execute the job is determined by the job information distribution unit 64. The profile request includes, for example, information about the corresponding job (e.g., identification information of the job) and information about the printing company 10b determined by the job information distribution unit 64.

Step S21 and Step 22

The encryption processing unit 91 reads profile information corresponding to the job indicated by the profile request from the profile information storage unit 99, encrypts the profile information with a public key (second public key) corresponding to the printing company 10b indicated by the profile request and stored in the encryption key storage unit 98 (an example of encryption processing on profile information), and transmits the encrypted profile information to the job information distribution unit 64.

Step S23

The job information distribution unit 64 transmits the job information including the encrypted profile information and the schedule information to the management server 11 of the printing company 10b having the determined printing machine 30 via the communication unit 61. The communication unit 14 of the management server 11 of the printing company 10b receives the job information and the schedule information including the encrypted profile information.

Step S24

The encryption processing unit 21 of the management server 11 of the printing company 10b decrypts the encrypted profile information included in the job information received by the communication unit 14 with a private key (second private key) of the printing company 10b stored in the encryption key storage unit 23 (an example of decryption processing on profile information).

Step S25

The job execution instruction unit 18 of the management server 11 of the printing company 10b instructs the printing machine 30 to execute a job to which the decrypted profile information is applied, in accordance with the schedule information received by the communication unit 14.

Step S26

The job execution unit 33 of the printing machine 30 of the printing company 10b executes the job in response to a job execution instruction from the job execution instruction unit 18. For example, the job execution unit 33 causes the printer section 932 to print out the print data included in the job information on a recording medium such as a sheet of paper by using the profile of the profile information included in the job information.

Steps S27 and Step 28

When the execution of the job is completed, the job execution unit 33 transmits a completion notification of the execution of the job to the management server 11. The communication unit 14 of the management server 11 transmits the job execution completion notification received from the printing machine 30 to the job management service 60. The communication unit 61 of the job management service 60 receives the job execution completion notification.

Step S29

The communication unit 61 of the job management service 60 stores the received job completion notification in the job information storage unit 69, and the prediction parameter correcting unit 63 corrects the prediction parameters. The prediction parameters may be corrected, for example, periodically.

Step S30

The billing information notifying unit 66 of the job management service 60 notifies the billing service 80 of the withdrawal information of the printing company 10a and the deposit information of the printing company 10b. Upon receiving the notification, the billing processing unit 81 of the billing service 80 registers the withdrawal information of the printing company 10a and the deposit information of the printing company 10b in the billing information storage unit 89, and requests the banking system corresponding to the bank accounts of the printing companies 10a and 10b to perform transfer processing based on the information.

Job Execution Determination Process

Figure 10:
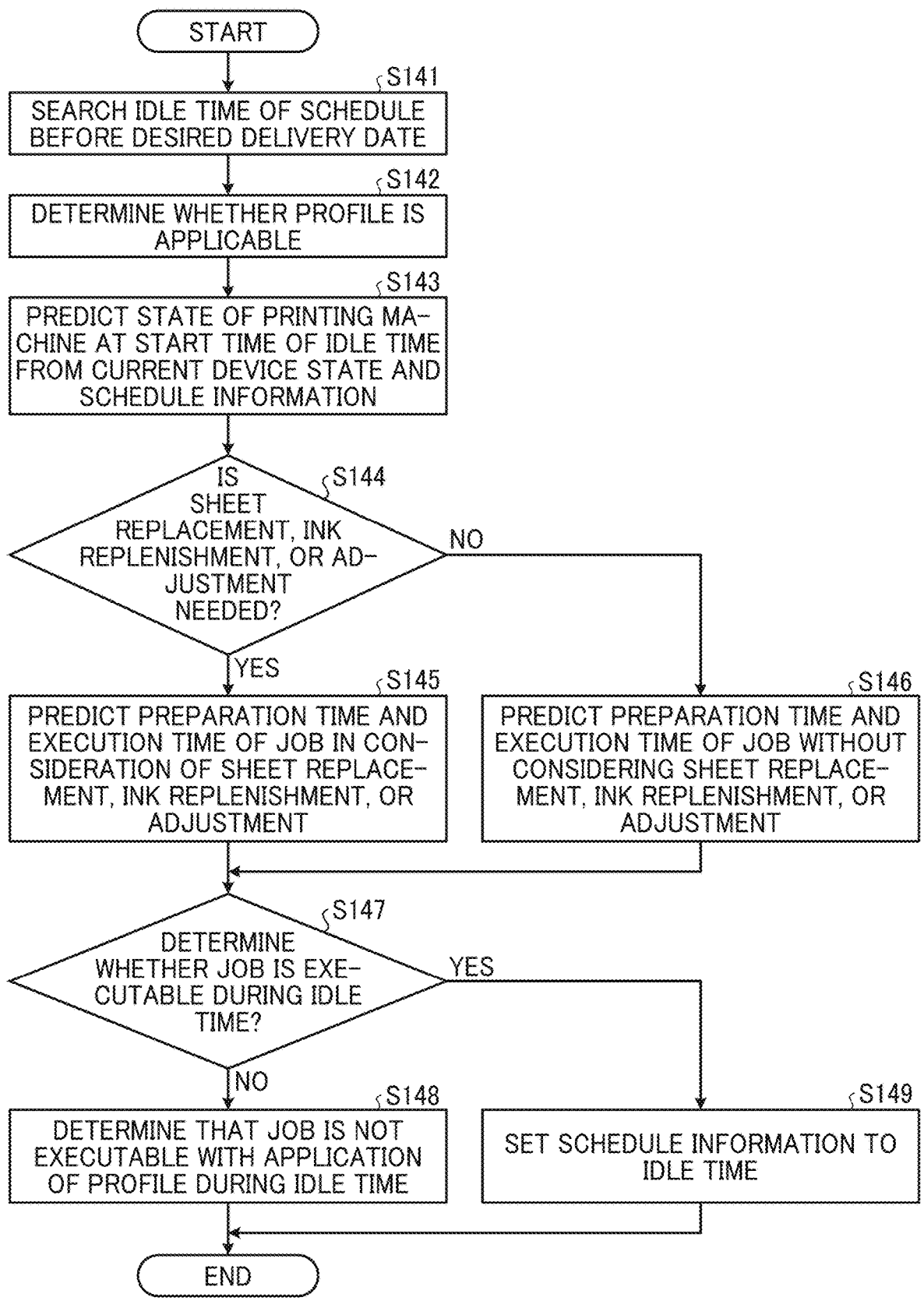
FIG. 10 is a flowchart illustrating a job execution determination process according to an embodiment of the present disclosure.

FIG. 9 is a diagram illustrating print preparation and printing of a job indicated by arrow lines. FIG. 10 is a flowchart illustrating a job execution determination process according to an embodiment of the present disclosure. With reference to FIGS. 9 and 10, the job execution determination process in step S14 of FIG. 7 is described in detail.

FIG. 9 illustrates the print preparation and print schedule information for two printing machines 30 (printing machines A and B). A dotted line indicates print preparation and a solid line indicates printing. A portion without a dotted line or a solid line is an idle time.

The length of arrow represents time.

Next, with reference to FIG. 10, a specific procedure of the job execution determination process in step S14 of FIG. 7 described above is described.

Step S141

The job execution determination unit 16 searches for an idle time in the schedule information up to the desired delivery date for a printing machine 30 (all printing machines 30 if there are a plurality of printing machines 30) of the printing company 10a. Then, the process proceeds to step S142.

Step S142

The job execution determination unit 16 applies the profile information included in the target job information to the printing machine 30 having the idle time of the schedule information and determines whether the job information can be executed by the printing machine 30. Then, the process proceeds to step S143.

Step S143

The job execution determination unit 16 predicts the state of the printing machine 30 at the start time of the idle time from die current device state and the schedule information up to the idle time of interest for the printing machine 30 to which the profile information can be applied. The state of the printing machine 30 is, for example, a set sheet type, sheet remaining amount, ink, ink remaining amount, or adjustment state. A prediction method is described below. The reason why the state of the printing machine 30 at the start time of the idle time is predicted as described above is that operations necessary before the start of printing include setting of sheet of paper, replacement of roll sheets of paper, ink replenishment, head cleaning, adjustment (alignment, color tone, etc.), test printing, and the like, and in commercial printing, the time required for preparation is long. Then, the process proceeds to step S144.

Step S144

The job execution determination unit 16 determines the necessity of sheet replacement, ink replenishment, or adjustment as preparation for job execution from the predicted state of the printing machine 30 and new job information. The new job information also determines the sheet type to be set, the required number of sheets, (the type of) ink, the amount of ink, and the like. When such predicted states are different from the states of the printing machine 30 set for executing new job information, the job execution determination unit 16 determines that replacement, adjustment, or replenishment is necessary. Note that it is desirable to determine the necessity of head cleaning. The job execution determination unit 16 also determines the prediction of the state of the printing machine 30 and the necessity of head cleaning with reference to the past history. When sheet replacement, ink replenishment, or adjustment is necessary (Yes in step S144), the process proceeds to step S145. When sheet replacement, ink replenishment, or adjustment is unnecessary (No in step S144), the process proceeds to step S146.

Step S145

When sheet replacement, ink replenishment, or adjustment is necessary, the job execution determination unit 16 predicts a preparation time and an execution time of the job in consideration of sheet replacement, ink replenishment, or adjustment. The time required for sheet replacement, ink replenishment, or adjustment is estimated in advance for each type of sheet of paper and each content of adjustment. Then, the process proceeds to step S147.

Step S146

When sheet replacement, ink replenishment, or adjustment is unnecessary, the job execution determination unit 16 predicts the preparation time of the job without considering the sheet replacement, the ink replenishment, or the adjustment. In this case, the job execution determination unit 16 sets, for example, a predetermined time (a minimum time required to start the operation of the printing machine 30) as the preparation time of the job. Then, the process proceeds to step S147.

Step S147

Next, the job execution determination unit 16 applies the profile information to the free time and determines whether the job can be executed. That is, when the idle time is longer than the sum of the preparation time and the execution time, the job execution determination unit 16 determines that the job can be executed in the idle time. However, when the predicted execution end time exceeds the desired delivery date, the job execution determination unit 16 determines that the job cannot be executed during the idle time. When the predicted execution end time does not exceed the desired delivery date but the next schedule information is registered after the idle time, the job execution determination unit 16 corrects the prediction of the preparation time of the job information set after the end of the new job. The prediction is performed in the same manner as in step S143. The job execution determination unit 16 also determines that the job cannot be executed in the idle time when the preparation start time of the next job information is advanced to meet the desired delivery date due to a change in the preparation time but the predicted execution end time of the new job exceeds the advanced preparation start time of the next job information. If the job cannot be executed during the idle time (No in step S147), the process proceeds to step S148. If the job can be executed (Yes in step S147), the process proceeds to step S149.

Step S148

When the job cannot be executed in the idle time, the job execution determination unit 16 determines that the job cannot be executed in the idle time.

Step S149

When the job can be executed in the idle time, the job execution determination unit 16 sets the schedule information to the idle time.

As described above, the job execution determination unit 16 determines whether a job can be executed for each idle time. When there are a plurality of executable idle times, the job execution determination unit 16 selects an idle time for executing the job as follows, for example.

The job execution determination unit 16 selects an idle time in which the preparation time of the next schedule information is shorter.

When the gap time of each idle time with the next schedule information is equal to or less than a threshold value, the job execution determination unit 16 selects an idle time having a shorter gap time.

If the gap time of each idle time with the next schedule information is greater than the threshold value, the job execution determination unit 16 selects an idle time having a longer gap time.

These selection methods can reduce the preparation time such as sheet replacement, reduce an idle time in which no job is allocated, and allocate another job to an idle time, thus enhancing the overall productivity.

Device State Prediction Process

Figure 11:
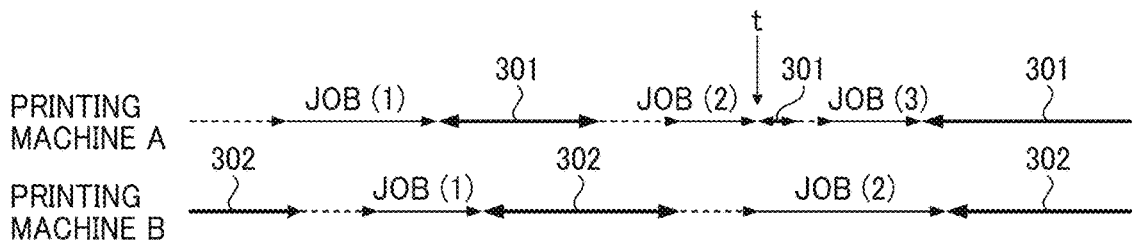
FIG. 11 is a diagram illustrating prediction of a device state at a start time of an idle time according to an embodiment of the present disclosure.
Figure 12:
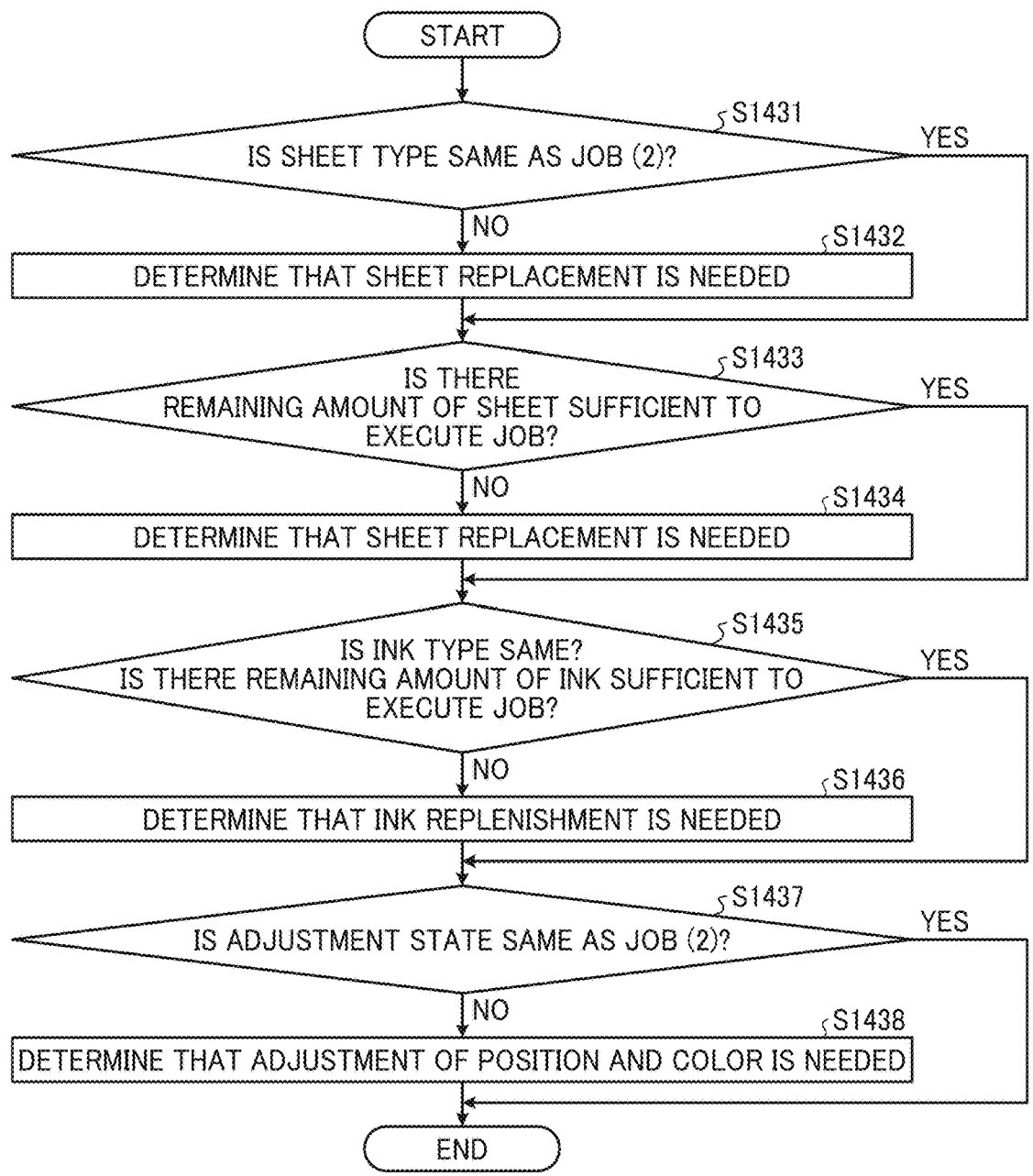
FIG. 12 is a flowchart illustrating a procedure of a prediction process of a device state according to an embodiment of the present disclosure.

FIG. 11 is a diagram illustrating the prediction of the device state at the start time of the idle time. FIG. 12 is a flowchart illustrating a device state prediction process according to an embodiment of the present disclosure. With reference to FIGS. 11 and 12, the device state prediction process in step S143 of FIG. 10 is described in detail.

FIG. 11 illustrates an example in which jobs (1) to (3) are set in a printing machine A and jobs (1) and (2) are set in a printing machine B. A thick double arrow 301 between jobs indicates job information added to an idle time in the printing machine A. A double-headed arrow 302 indicates job information added to an idle time in the printing machine B. When it is determined that a job can be executed in an idle time, a new job is set to the idle time. Hereinafter, with reference to FIG. 12, a procedure is described of determining whether a new job can be set in an idle time between the job (2) and the job (3) scheduled to be executed by the printing machine A. As described above in step S143 of FIG. 10, the job execution determination unit 16 predicts the state of the printing machine 30 at a start time t of an idle time at which the job (2) immediately before the idle time ends.

Step S1431

First, the job execution determination unit 16 determines whether the sheet type of the new job is the same as that of job (2). If they are different (No in step S1431), the process proceeds to step S1432. If they are the same (Yes in step S1431), the process proceeds to step S1433.

Step S1432

When the sheet type of the new job is different from the sheet type of the job (2), the job execution determination unit 16 determines that the sheet needs to be replaced. Then, the process proceeds to step S1433.

Step S1433

Next, the job execution determination unit 16 determines whether there is a remaining amount of sheet sufficient to execute the job. In a case where the job (1), the job (2), and the new job are of the same sheet type, the job execution determination unit 16 subtracts the usage amounts of the job (1) and the job (2) from the current remaining sheet amount in the device information. When the job (1) and the job (2) have different sheet types and the new job has the same sheet type as the job (2), the job execution determination unit 16 subtracts the usage amount of the job (2) from the remaining amount (which is not necessarily the remaining amount of a new sheet roll) of the sheet type used by the job (2). When it is predicted that the sheet will be used up and replaced during the execution of the job (1) and the job (2) or the execution of the job (2), the job execution determination unit 16 subtracts the subsequent usage amount from the sheet amount after the replacement. In a case where the sheet is different between the job (2) and the new job, the sheet needs to be replaced. For this reason, the job execution determination unit 16 acquires the remaining amount (which is not necessarily the remaining amount of a new sheet roll) of the sheet type used in the new job.

When there are a plurality of stocks of the same sheet, a roll having a larger remaining amount than that of a new job may be selected to reduce sheet replacement during execution of the new job. Further, in order to prevent a sheet from being discarded, a roll whose remaining amount is smaller than that of a new job may be selected to use up the sheet. The replacement policy may be changed by administrator settings.

As a result of comparing the sheet remaining amount at the completion of the job (2) or the sheet remaining amount of the replaced sheet type with the number of sheets necessary for the new job, when it is predicted that the sheet will be used up and replaced during the job (No in step S1433), the process proceeds to step S1434, and otherwise (Yes in step S1433), the process proceeds to step S1435.

Step S1434

As a result of comparing the sheet remaining amount at the completion of execution of the job (2) or the sheet remaining amount of the replaced sheet type with the number of sheets necessary for the new job, when it is predicted that the sheet will be used up and replaced during execution of the job, the job execution determination unit 16 determines that replacement with a new sheet roll is necessary. Then, the process proceeds to step S1435.

Step S1435

Next, the job execution determination unit 16 determines whether the ink type is the same as that of the job (2) and whether there is an ink remaining amount sufficient to execute the job. The concept is the same as that in the cases of the sheet type and the sheet remaining amount. However, the time required for replacement and replenishment of ink is shorter than that of sheet. When the ink type is different or when the ink type is the same and there is no ink remaining amount sufficient to execute the job (No in step S1435), the process proceeds to step S1436. When the ink type is the same and there is an ink remaining amount sufficient to execute the job (Yes in step S1435), the process proceeds to step S1437.

Step S1436

In a case where the ink type is different or when the ink type is the same and there is no ink remaining amount sufficient to execute the job, the job execution determination unit 16 determines that ink replenishment is necessary so that replenishment does not occur during the execution of the job. Then, the process proceeds to step S1437.

Step S1437

Next, the job execution determination unit 16 determines whether the adjustment state is the same as that of the job (2). The adjustment state refers to a formation position and a color development state of an image on a sheet. At the end of the job (2), the sheet and image quality requests are in the adjustment state in accordance with the sheet and image quality requests of the job (2). Therefore, since whether the adjustment state is the same as that of the new job is determined by the sheet and image quality requests of the new job, the job execution determination unit 16 determines whether both are the same. In a case where both are not the same (No in step S1437), the process proceeds to step S1438. In a case where both are the same (Yes in step S1437), the device state prediction process ends. As a method of determining whether the adjustment states are the same, it may be determined whether the profile information used in a plurality of jobs is the same.

Step S1438

If they are not the same, the job execution determination unit 16 determines that the position and color need to be adjusted. Then, the device state prediction process ends.

As described above, the state of the printing machine 30 at the start time of the idle time can be predicted, and the preparation time can be calculated based on the predicted state of the printing machine 30 and the state of the printing machine 30 set based on the received job information.

Preparation Time and Execution Time

Figures 13, 14:
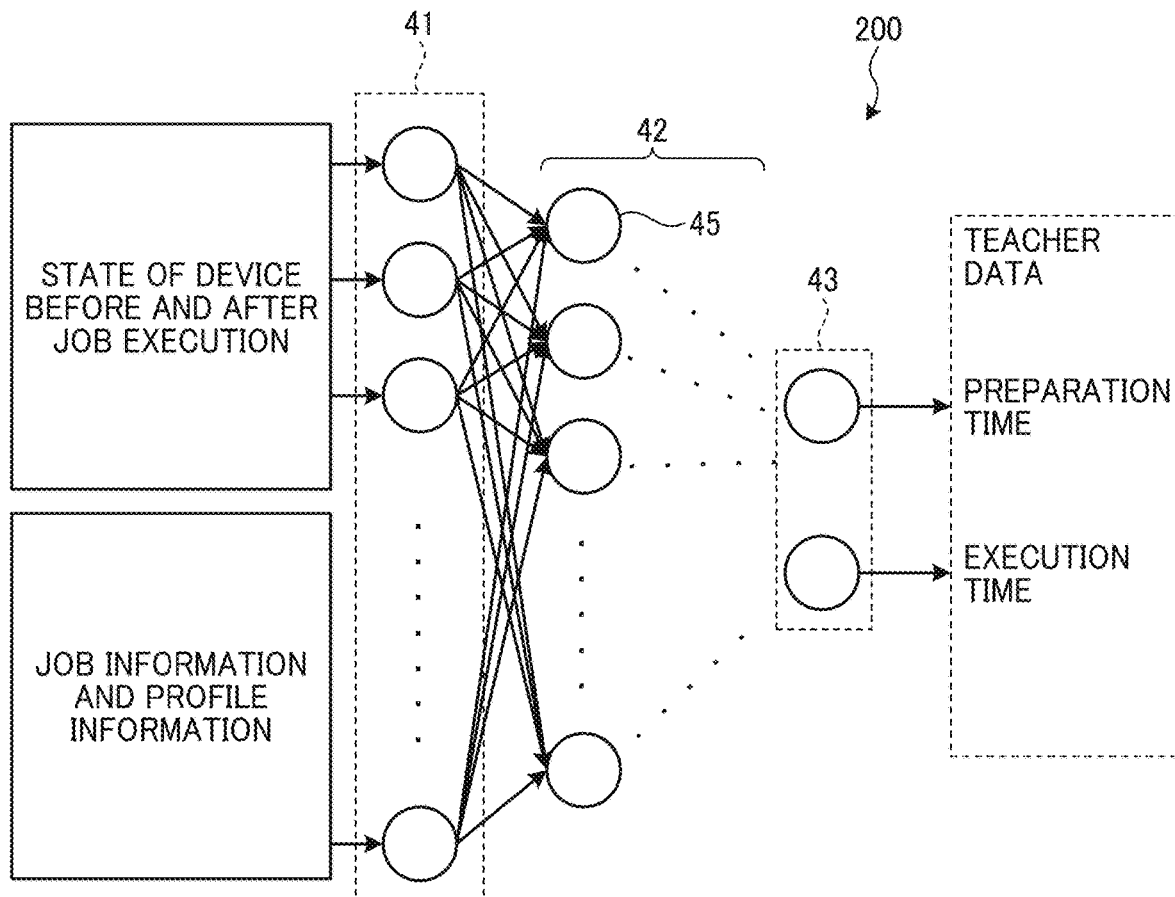
FIG. 13 is a diagram illustrating an operation of predicting a preparation time and an execution time.
FIG. 14 is a diagram illustrating a neural network used for machine learning according to an embodiment of the present disclosure.

FIG. 13 is a diagram illustrating an operation of predicting the preparation time and the execution time. The preparation time and the execution time are described with reference to FIG. 13.

The preparation time is a time required for preparation, and the execution time is a time required for execution of a job. As illustrated in FIG. 13, the preparation time can be represented by "$T_{PC}+T_{if}+T_{he}+T_{ac}+T_{tp}$". That is, the preparation time is the sum of the time required for sheet replacement, the time required for ink replenishment, the time required for head cleaning, the time required for adjustment, and the time required for test printing. As described above, the sum of the time required for sheet replacement, ink replenishment, adjustment, and so forth necessary to obtain the state of the printing machine 30 based on the job information received by the job information accepting unit 17 is the preparation time.

Here, $T_{PC}$ is the time required for sheet replacement. If the sheet type is the same for the previous job and the new job, and a sufficient remaining amount remains, replacement is unnecessary and $T_{PC}$ is 0. $T_{if}$ is the time required for ink replenishment. If the ink type is the same as that of a new job and a sufficient remaining amount remains, replenishment is unnecessary and $T_{if}$ is 0. $T_{he}$ is the time required for head cleaning. $T_{he}$ is 0 when it can be determined from the past execution history that head cleaning is unnecessary. $T_{ac}$ is the time required for adjustment (alignment, color tone, or the like). $T_{ac}$ is 0 when it can be determined that a previous job and a job to be executed have the same sheet and image quality requests and adjustment is unnecessary from the past execution history. $T_{tp}$ is the time required for test printing.

The execution time can also be represented by "$T_{PC}+T_{if}+T_{he}+T_{ac}+T_{pp}$". That is, the execution time is the sum of the time required for sheet replacement during execution of a job, the time required for ink replenishment, the time required for head cleaning, the time required for adjustment, and the printing time. Where $T_{PC}$, $T_{if}$, $T_{he}$, and $T_{ac}$ are times when replacement occurs during execution of a job. In the execution time, not the test printing time $T_{tp}$ but the printing time $T_{pp}$ is predicted. The printing time $T_{pp}$ is calculated by "the number of pages per copy×the number of sheets in job information/printing speed".

Job Execution Completion Notification

The management server 11 transmits a job execution completion notification to the job management service 60 when the execution of the job in the printing machine 30 is completed. The job execution completion notification includes, for example, a log (preparation time and execution time) of the executed job, an amount of money, and states of the printing machine 30 before and after the execution of the job.

The states of the printing machine 30 before and after the job execution include, for example, the sheet type of the previous job, the sheet type of the new job, the sheet remaining amount of the previous job, the number of sheets to be consumed by the new job, the ink type of the previous job, the ink type of the new job, the remaining ink amount of the previous job, the remaining ink amount of the new job, the adjustment state of the previous job, and the adjustment state of the new job.

The job management service 60 accumulates the states of the printing machine 30 before and after the job execution in association with the job execution completion notification and performs statistical processing or machine learning, thus enhancing the prediction accuracy of the preparation time and the execution time.

Machine learning is a technique for causing a computer to acquire human-like learning capability, and refers to a technique in which a computer autonomously generates an algorithm necessary for determination of data identification or the like from learning data acquired in advance, and applies the algorithm to new data to perform prediction. The learning method for machine learning may be any method of supervised learning, unsupervised learning, semi-supervised learning, reinforcement learning, and deep learning, and may be a learning method combining these learning methods, and the learning method for machine learning is not limited to any particular method.

FIG. 14 is a diagram illustrating a neural network used for machine learning according to an embodiment of the present disclosure. A neural network having a deep hierarchy is referred to as a deep neural network (DNN). A layer between an input layer 41 and an output layer 43 is referred to as an intermediate layer 42. The number of layers, the number of nodes 45, and the like in FIG. 14 are examples.

For example, the states of the printing machine 30 before and after execution of a job and job information including profile information are input to the input layer 41. For information that is not a numerical value such as the sheet type and the ink type of the job, numerical values corresponding to the sheet type and the ink type of the job are prepared and input. Alternatively, each of the sheet type and the ink type may be represented by one-hot vector. The number of nodes of the output layer 43 is two corresponding to the preparation time and the execution time.

Input data input to the input layer 41 is transmitted to the output layer 43 through the node 45 in a forward propagation manner. The nodes are connected by weights (parameters), and an activation function is set in each node 45. In the present embodiment, since the output of the nodes of the output layer 43 are brought close to the actual preparation time and execution time, this becomes a regression problem for predicting quantitative data. Thus, the activation function of a node of the output layer 43 may be an identity mapping that does not transform anything. A loss function for evaluating a difference between an output of each node of the output layer 43 and teacher data (preparation time and execution time) is known, and a square error is often used as a loss function in the case of a regression model. The loss evaluated by the loss function propagates through the neural network 200 in the reverse direction from the output layer 43 to the input layer 41, and the parameters (the weights connecting the nodes) of the neural network 200 are updated. Such a learning method is called an error backpropagation method.

Although the preparation time and the execution time are predicted in FIG. 14, the state change of the printing machine 30 can be predicted assuming that the teacher data of the output layer 43 is the state change of the printing machine 30. In this case, a number of nodes corresponding to the state of the printing machine 30 are prepared in the output layer 43, and the state of the printing machine 30 is associated with each node. The state of the printing machine 30 in this case is, for example, the sheet type, the ink, or the adjustment state, and the neural network 200 learns the parameters with "1" when there is a state change and "0" when there is no state change.

Note that although the neural network 200 is described with reference to FIG. 14, machine learning techniques include perceptron, deep learning, support vector machine, logistic regression, naive Bayes, decision tree, random forest, and the like, and are not limited to the techniques described in the present embodiment.

In FIG. 7 described above, the profile information of the printing company 10a is encrypted with the private key of the printing company 10a and then decrypted with the public key of the printing company 10a in the profile management service 90 of the cloud system 50. When the profile information is distributed to the printing company 10b, the profile information is encrypted with the public key of the printing company 10b and then decrypted with the private key of the printing company 10b in the management server 11 of the printing company 10b. The encrypted communication method for the profile information is not limited to the above-described method. For example, encrypted communication using an electronic signature described below may be performed. The management server 11 of the printing company 10a generates an electronic signature of the profile information using a private key (first private key) of the printing company 10a, and transmits the profile information and the electronic signature to the cloud system 50 by transport layer security (TLS) (an example of encryption processing on profile information). At this time, the management server 11 may also transmit the public key of the printing company 10a to the cloud system 50. The profile management service 90 of the cloud system 50 decrypts the received electronic signature using the public key (first public key) of the printing company 10a, verifies the profile information using the decrypted electronic signature (an example of decryption processing on profile information), and then registers the profile information and the decrypted electronic signature in the profile information storage unit 99. Note that the public key for electronic signature and the public key for encryption may be managed separately. When the printing company 10 (printing company 10b in this case) to which the profile information is distributed together with the job is determined by the job information distribution unit 64, the profile management service 90 encrypts the electronic signature by the printing company 10b and the profile information using the public key (second public key) of the determined printing company 10a (an example of encryption processing on profile information) and distributes the encrypted profile information to the management server 11 of the printing company 10b. In this case, the profile management service 90 may encrypt the profile information with a randomly generated common key, encrypt only the common key with the public key of the printing company 10b, and attach the encrypted common key to the profile information. The management server 11 of the printing company 10b decrypts the received electronic signature and profile information of the printing company 10a using the private key (second private key) of the printing company 10b, verifies the profile information using the decrypted electronic signature (an example of decryption processing on profile information), and causes the printing machine 30 to print out a job to which the profile information is applied. As described above, encrypted communication using an electronic signature may be performed. Performing such encrypted communication for profile information can prevent tampering or spoofing of data (profile information) and achieve transmission and reception of the profile information with high safety.

As described above, in the device system 100 according to the present embodiment, the communication unit 61 acquires (receives) profile information including a profile to be applied to printout together with a job from the management server 11 of the printing company 10a. The encryption processing unit 91 decrypts the profile information acquired by the communication unit 61 and stores the decrypted profile information in the profile information storage unit 99. The job information distribution unit 64 distributes the profile information to be applied to the job, together with the job executed by the printing machine 30 of the printing company 10b, to the management server 11 of the printing company 10b. Thus, profile information of a specific company (for example, the printing company 10a) is distributed to other companies (for example, the printing company 10b), thus allowing other companies to print with the same quality.

The communication unit 61 receives (acquires) the profile information encrypted with the private key of the printing company 10a from the management server 11 of the printing company 10a. The encryption processing unit 91 decrypts the profile information with the public key of the printing company 10a. The communication unit 61 encrypts the decrypted pro file information with the public key of the printing company 10b, and the job information distribution unit 64 distributes the encrypted profile information to the management server 11 of the printing company 10b that can decrypt the encrypted profile information with the private key. Thus, profile information of a specific company (for example, the printing company 10a) can be safely distributed to other companies (for example, the printing company 10b).

The communication unit 61 acquires (receives), from the management server 11 of the printing company 10a, the profile information to be applied to the job together with the job determined to be unexecutable by the printing machine 30 held by the printing company 10a. The job information distribution unit 64 determines a printing machine 30 of a company other than the printing company 10a that can execute the job to which the profile information is applied, and distributes the job and the profile information to the management server 11 of the company (for example, the printing company 10b) holding the determined printing machine 30. Thus, a job that cannot be executed by one company can be distributed to another company that can execute the job together with the profile information, so that the desired delivery date can be observed and the operating rate of the printing machine 30 can be increased.

Second Embodiment

A device system 100*a* according to a second embodiment of the present disclosure is described focusing on differences from the device system 100 according to the first embodiment. In the first embodiment, the operation has been described in which in a case where a printing company 10*a* that has received a job cannot execute the job, profile information is included in job information and the job information is transferred to another printing company 10*b* via the cloud system 50. In the present embodiment, an operation is described in which a profile can be registered in a profile sales site independently of a job and a printing company 10*b* can purchase any profile to be applied to the job from the profile sales site. Note that the hardware configurations of a cloud system 50*a*, a management server 11*a*, and a printing machine 30 in the device system 100*a* according to the present embodiment are the same as those of the cloud system 50, the management server 11, and the printing machine 30 described in the first embodiment.

Schematic Configuration of Device System

Figure 15:
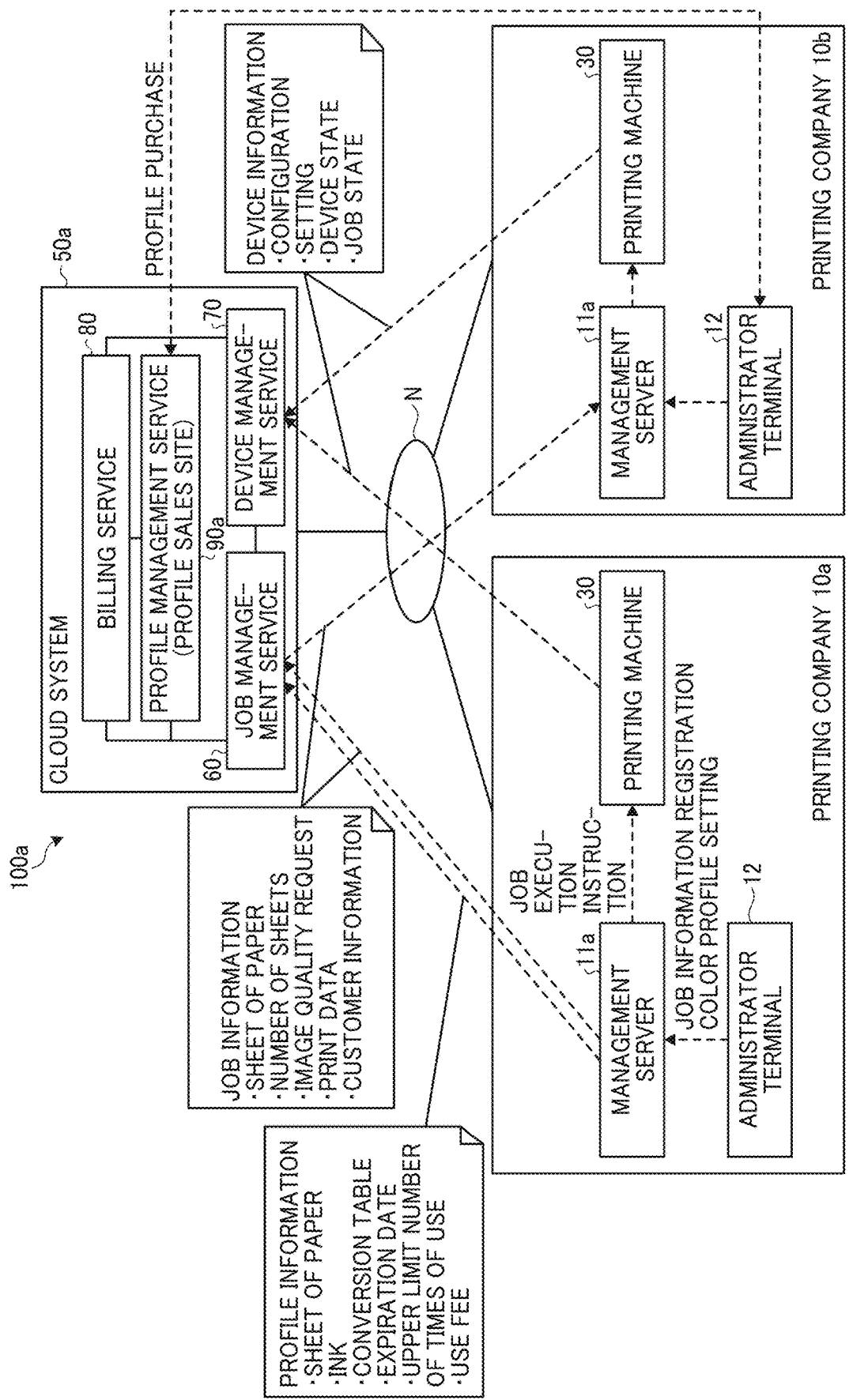
FIG. 15 is a diagram illustrating a schematic configuration of a device system according to a second embodiment of the present disclosure.

FIG. 15 is a diagram illustrating a schematic configuration of a device system according to a second embodiment of the present disclosure. A schematic configuration of the device system 100*a* according to the present embodiment is described below with reference to FIG. 15.

As illustrated in FIG. 15, the device system 100*a* includes: a cloud system 50*a*; a management server 11*a*, an administrator terminal 12, and a printing machine 30 of a printing company 10*a*; and a management server 11*a*, an administrator terminal 12, and a printing machine 30 of a printing company 10*b*. The cloud system 50*a* and the management server 11*a*, the administrator terminal 12, and the printing machine 30 of each of the printing companies 10*a* and 10*b* can perform data communications with each other via a network N.

The management server 11*a*, the administrator terminal 12, and the printing machine 30 of the printing company 10*a* are an example of a "first company system" according to embodiments of the present disclosure, and the management server 11*a*, the administrator terminal 12, and the printing machine 30 of the printing company 10*b* are an example of a "second company system" according to embodiments of the present disclosure.

The system of each printing company 10 includes the management server 11*a*, the administrator terminal 12, and the printing machine 30. The management server 11*a*, the administrator terminal 12, and the printing machine 30 may be capable of data communication with each other via a network in the system of the printing company 10.

The management server 11*a* is an information processing apparatus such as a PC or a workstation that accepts registration of job information and setting of a profile (including a profile purchased from the cloud system 50*a*) from the administrator terminal 12 and instructs the printing machine 30 to apply the set profile to a job and execute the job. For example, the management server 11*a* may cause the administrator terminal 12 to display a screen for accepting registration of job information and setting of a profile as a Web server. In this case, since a browser is operating, the administrator terminal 12 displays a Web page that displays the above-described screen transmitted from the management server 11*a* serving as a Web server.

The management server 11*a* also encrypts the selected profile with a private key and transmits the encrypted profile to the cloud system 50*a* for registration in order to sell the selected profile according to an operation of the administrator terminal 12. The management server 11*a* purchases any profile from the cloud system 50*a* according to an operation of the administrator terminal 12.

The cloud system 50*a* is an information processing system including one or more information processing apparatuses that determine and distribute job information received from a specific printing company 10 to an executable printing company 10. As illustrated in FIG. 15, the cloud system 50*a* includes a job management service 60, a device management service 70, a billing service 80, and a profile management service 90*a*. Each service is a function provided by the cloud system 50*a*.

The job management service 60 receives job information from the management server 11*a* of each printing company 10, centrally manages the job information, refers to device information managed by the device management service 70, and distributes the job information to an appropriate printing company 10.

The device management service 70 receives the device information from each printing machine 30 and provides the device information to the job management service 60.

In a case where the job is distributed to another printing company 10*b* (in a case where the printing company 10*a* having received the job does not perform printing), the billing service 80 registers withdrawal information from the printing company 10*a* that has transferred the job and deposit information to the printing company 10*b* that has received the job. The billing service 80 registers withdrawal information from the printing company 10*b* who has purchased the profile information and deposit information to the printing company 10*a* who has provided the profile information with respect to the fee of the profile information. Alternatively, when the job is not distributed to another printing company 10*b* (when the printing company 10*a* who has received the order for the job persons printing), the billing service 80 registers the withdrawal information from the customer and the deposit information to the printing company 10*a* that has executed the job, ill response to the completion notification of the job.

The profile management service 90*a* functions as a profile sales site, and receives and manages profile information requested for registration from the management server 11*a* of the printing company 10*a*. The profile management service 90*a*, as a profile sales site, encrypts profile information of a profile requested to be purchased by the printing company 10*b* with a public key corresponding to the printing company 10 and transmits the encrypted profile information.

Configuration and Operation of Functional Blocks of Device System

Figure 16:
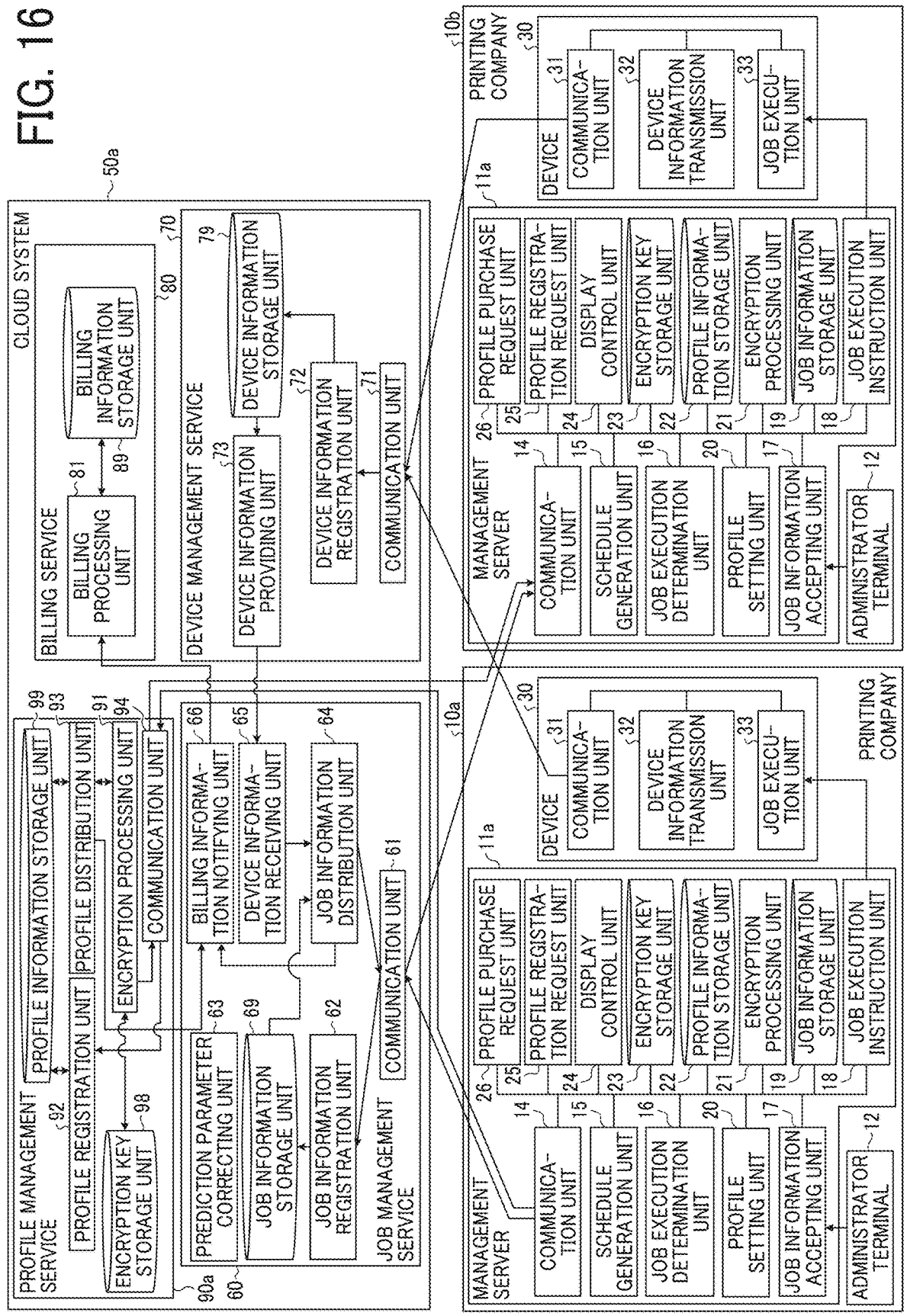
FIG. 16 is a diagram illustrating an example of a configuration of functional blocks of the device system according to the second embodiment of the present disclosure.

FIG. 16 is a diagram illustrating an example of a configuration of functional blocks of the device system according to the second embodiment of the present disclosure. The configuration and operations of functional blocks of the device system 100*a* are described below with reference to FIG. 16. Functional blocks and operations of the printing machine 30, the device management service 70, and the billing service 80 are the same as those in the first embodiment.

Management Server

As illustrated in FIG. 16, the management server 11*a* of the printing company 10 includes a communication unit 14, a schedule generation unit 15, a job execution determination unit 16, a job information accepting unit 17, a job execution instruction unit 18, a job information storage unit 19, a profile setting unit 20, an encryption processing unit 21, a profile information storage unit 22, an encryption key storage unit 23, a display control unit 24, a profile registration request unit 25, and a profile purchase request unit 26. The operations of the schedule generation unit 15, the job execution determination unit 16, the job information accepting unit 17, the job execution instruction unit 18, the job information storage unit 19, the profile setting unit 20, the profile information storage unit 22, the encryption key storage unit 23, and the display control unit 24 are the same as those in the first embodiment.

The encryption processing unit 21 is a functional unit that encrypts profile information relating to a registration request made by the profile registration request unit 25 the private key of the printing company 10 itself stored in the encryption key storage unit 23. The encryption processing unit 21 decrypts the profile information purchased from the profile management service 90a by the profile purchase request unit 26 with the private key of the printing company 10 itself stored in the encryption key storage unit 23.

The profile registration request unit 25 is a functional unit that transmits selected profile information via the communication unit 14 in order to register the profile information in the profile management service 90a in accordance with an operation of the administrator terminal 12.

The profile purchase request unit 26 is a functional unit that requests the profile management service 90a to purchase profile information selected from profile information registered in the profile management service 90a in accordance with an operation of the administrator terminal 12. The profile purchase request unit 26 may have a function of requesting a display screen displaying a list of purchasable profiles from the profile management service 90a.

The communication unit 14 is a functional unit that transmits and receives various types of information to and from the job management service 60 and the profile management service 90a. The communication unit 14 transmits job information registered by the administrator terminal 12 and a job execution completion notification to the job management service 60. The communication unit 14 transmits a registration request of profile information to the profile management service 90a together with the profile information, and transmits a purchase request of a profile to the profile management service 90a. The communication unit 14 is implemented, for example, by executing a program by the network I/F 509 and the CPU 501 illustrated in FIG. 3.

The schedule generation unit 15, the job execution determination unit 16, the job information accepting unit 17, the job execution instruction unit 18, the profile setting unit 20, the encryption processing unit 21, the display control unit 24, the profile registration request unit 25, and the profile purchase request unit 26 described above are implemented by, for example, the CPU 501 illustrated in FIG. 3 executing programs. Some or all of these functional units may be implemented by an integrated circuit(s) such as an FPGA(s) or an ASIC(s), instead of a program(s) that is software.

Each functional unit of the management server 11a illustrated in FIG. 16 conceptually illustrates a function, and is not limited to such a configuration. For example, a plurality of functional units illustrated as independent functional units in the management server 11a illustrated in FIG. 16 may be configured as one functional unit. On the other hand, in the management server 11a illustrated in FIG. 16, a function of one functional unit may be divided into a plurality of functional units.

Job Management Service

As illustrated in FIG. 16, the job management service 60 of the cloud system 50a includes a communication unit 61, a job information registration unit 62, a prediction parameter correcting unit 63, a job information distribution unit 64, a device information receiving unit 65, a billing information notifying unit 66, and a job information storage unit 69. The operations of the job information registration unit 62, the prediction parameter correcting unit 63, the device information receiving unit 65, and the job information storage unit 69 are the same as those in the first embodiment.

The communication unit 61 is a functional unit that transmits and receives various types of information to and from the management server 11a of the printing company 10. For example, the communication unit 61 receives job information from the management server 11a. The communication unit 61 transmits job information and schedule information to the management server 11a. The communication unit 61 also receives a job execution completion notification from the management server 11a. The communication unit 61 is implemented, for example, by executing a program by the network I/F 509 and the CPU 501 illustrated in FIG. 3.

The job information distribution unit 64 is a functional unit that determines a printing machine 30 that can execute a job by referring to newly registered job information, existing job information and schedule information, and device information received from the device management service 70. The job information distribution unit 64 also generates schedule information related to a job to be distributed to the determined printing machine 30. In addition, the job information distribution unit 64 transmits job information and schedule information to the management server 11a of the printing company 10 having the determined printing machine 30 via the communication unit 61. The job information distribution unit 64 stores the schedule information in the job information storage unit 69 in association with the job information. In this embodiment, the job information stored in the job information storage unit 69 differs from that in the first embodiment in that the profile is purchased prior to the job, and therefore the profile information is stored independently of the job information. When a job is ordered, registered, received, and printed, a profile is necessary for reproduction of color at the time of printing. Therefore, when a profile is designated, profile identification information or bibliographic information may be included in job information. Further, the job information and necessary profile information may be associated with each other, or the profile information may be included in the job information by profile designation.

The billing information notifying unit 66 is a functional unit that, when another printing company 10b executes a job registered by a specific printing company 10a, notifies the billing service 80 of withdrawal information of the specific printing company 10a and deposit information to the other printing company 10b. This is because a fee received by the specific printing company 10a is received by another printing company 10b. However, an information provision fee remains for the specific printing company 10a. The billing information notifying unit 66 notifies the billing service 80 of the withdrawal information from another printing company 10b who has purchased the profile information and the deposit information to the specific printing company 10a who has provided the profile information regarding the fee of the profile information. When a print job received from a customer to the specific printing company 10a is executed by a machine owned by another printing company 10b, at least part of the print job fee having been paid from the customer to the printing company 10a is paid to the printing company 10b. When the printing company 10b acquires profile information necessary for the print job registered in advance by the printing company 10a to execute the job, the profile fee set by a profile fee setting unit described below is charged on the printing company 10b. Thus, the fee of the print job and the fee of the profile can be offset.

The job information registration unit 62, the prediction parameter correcting unit 63, the job information distribution unit 64, the device information receiving unit 65, and the billing information notifying unit 66 described above are implemented by, for example, the CPU 501 illustrated in FIG. 3 executing programs. Some or all of these functional units may be implemented by an integrated circuit(s) such as an FPGA(s) or an ASIC(s), instead of a program(s) that is software.

Each functional unit of the job management service 60 illustrated in FIG. 16 conceptually illustrates a function, and is not limited to such a configuration. For example, a plurality of functional units illustrated as independent functional units in the job management service 60 illustrated in FIG. 16 may be configured as one functional unit. On the other hand, in the job management service 60 illustrated in FIG. 16, a function of one functional unit may be divided into a plurality of functional units.

Profile Management Service

The profile management service 90a of the cloud system 50a includes an encryption processing unit 91, a profile registration unit 92 (an example of a management unit), a profile distribution unit 93 (an example of a distribution unit), a communication unit 94 (an example of an acquisition unit), an encryption key storage unit 98, and a profile information storage unit 99 (an example of a storage unit). The operations of the encryption key storage unit 98 and the profile information storage unit 99 are the same as those in the first embodiment.

The communication unit 94 is a functional unit that transmits and receives various types of information to and from the management server 11a of the printing company 10. For example, the communication unit 94 receives the encrypted profile information together with the registration request from the management server 11a. The communication unit 94 receives a purchase request for requesting the purchase of profile information from the management server 11a. The communication unit 94 transmits the profile information indicated by the purchase request to the management server 11a of the request source. The communication unit 94 may have a function of receiving an acquisition request for a display screen of a list of purchasable profiles. The acquisition request can be received from the profile purchase request unit 26 of the management server 11a or from, for example, the administrator terminal 12. The communication unit 94 is implemented, for example, by executing a program by the network I/F 509 and the CPU 501 illustrated in FIG. 3.

The encryption processing unit 91 is a functional unit that receives the encrypted profile information received by the communication unit 94 and decrypts the profile information using the public key stored in the encryption key storage unit 98 corresponding to the printing company 10 that is the transmission source of the profile information. The encryption processing unit 91 stores the decrypted profile information in the profile information storage unit 99. When a purchase request is received from the management server 11a by the communication unit 94, the encryption processing unit 91 encrypts the profile information indicated by the purchase request using the public key stored in the encryption key storage wilt 98 corresponding to the printing company 10 as the request source.

The encryption processing unit 91 may store the profile information in the profile information storage unit 99 in the encrypted state before the profile information is decrypted. In this case, when a purchase request is received by the communication unit 94, the encryption processing unit 91 may once decrypt the profile information indicated by the purchase request using the public key corresponding to the printing company 10 that is the provider of the profile information, re-encrypt the profile information using the public key corresponding to the printing company 10 that is the request source, and transmit the profile information to the printing company 10 that is the request source. As a result, the management of profile information in the profile information storage unit 99 can be performed in an encrypted state, so that the security of information management can be enhanced.

The profile registration unit 92 is a functional unit that registers profile information in the profile information storage unit 99 when a registration request and profile information are received from the management server 11a of the printing company 10 by the communication unit 94. In this case, the profile registration unit 92 may register the profile information after the profile information is decrypted by the encryption processing unit 91 using the public key corresponding to the transmission source of the registration request, or may register the profile information in an encrypted state without decryption.

When a purchase request is received from the management server 11a of the printing company 10 by the communication unit 94, the profile distribution unit 93 is a functional unit that reads profile information indicated by the purchase request from the profile information storage unit 99 and distributes (transmits) the profile information to the management server 11a. In this case, the profile distribution unit 93 distributes the profile information after the profile information is encrypted by the encryption processing unit 91. The profile distribution unit 93 may have a function of transmitting a display screen of a list of purchasable profiles. When the communication unit 94 receives an acquisition request from the profile purchase request unit 26 of the management server 11a, the profile distribution unit 93 transmits a display screen of a list of purchasable profiles to the management server 11a. When the communication unit 94 receives an acquisition request also from, for example, the administrator terminal 12, the profile distribution unit 93 may transmit a display screen of a list of purchasable profiles to the administrator terminal 12.

The encryption processing unit 91, the profile registration unit 92, and the profile distribution unit 93 described above are implemented, for example, by executing programs by the CPU 501 illustrated in FIG. 3. Some or all of these functional units may be implemented by an integrated circuit(s) such as an FPGA(s) or an ASIC(s), instead of a program(s) that is software.

Each functional unit of the profile management service 90a illustrated in FIG. 16 conceptually illustrates a function, and is not limited to such a configuration. For example, a plurality of functional units illustrated as independent functional units in the profile management service 90a illustrated in FIG. 16 may be configured as one functional unit. On the other hand, in the profile management service 90a illustrated in FIG. 16, a function of one functional unit may be divided into a plurality of functional units.

Overall Process of Device System

Figure 17:
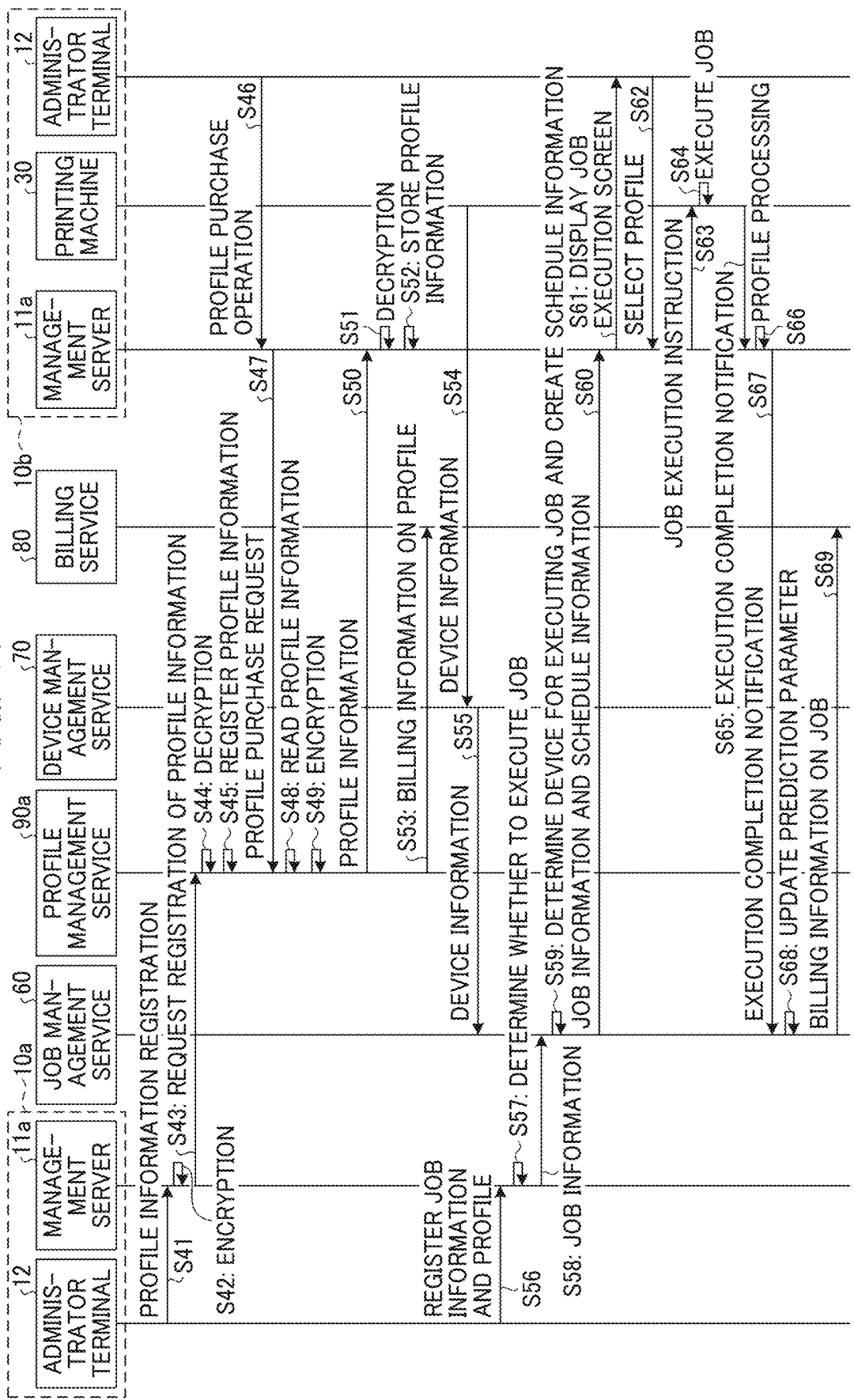
FIG. 17 is a sequence diagram illustrating an overall process of the device system according to the second embodiment of the present disclosure.

FIG. 17 is a sequence diagram illustrating an overall process of the device system according to the second embodiment of the present disclosure. FIG. 18 is a diagram illustrating an example of a job execution screen. FIG. 19 is a diagram illustrating an example of a profile list screen. FIG. 20 is a diagram illustrating an example of a profile sales registration screen. FIG. 21 is a diagram illustrating an example of a profile purchase screen. The overall process of the device system 100a according to the present embodiment is described below with reference to FIGS. 17 to 21. In FIG. 17, it is assumed that the printing company 10 that registers the job is a printing company 10a. In addition, in FIG. 17, the entity that registers profile information is the printing company 10a, but may be another printing company 10.

Step S41

The administrator terminal 12 of the printing company 10a displays a profile list screen 2200 for displaying a list of profile information registered in the profile information storage unit 22 of the management server 11a as illustrated in FIG. 19 on its own display device in accordance with the operation of the printing company 10a.

As illustrated in FIG. 19, the profile list screen 2200 includes a profile list display section 2201. The profile list display section 2201 is an area for displaying a list of profile information registered in the profile information storage unit 22. In the example illustrated in FIG. 19, a profile name, an explanatory text, paper, ink, and a creation date are displayed as profile information.

When a registration key corresponding to profile information desired as a sales target by the printing company 10a is pressed by an operation of the printing company 10a, the administrator terminal 12 displays a profile sales registration screen 2300 for registering profile information to be a sales target in the profile management service 90a as illustrated in FIG. 20.

As illustrated in FIG. 20, the profile sales registration screen 2300 includes a profile name input section 2301, a description text input section 2302, an upper limit input section 2305, a fee input section 2306, and an execution key 2311.

The profile name input section 2301 is an input area for inputting or editing the name of a profile. The description text input section 2302 is an input area for inputting or editing a description text of a profile.

The upper limit input section 2305 is an input area for inputting an upper limit value for use of a profile. In the example illustrated in FIG. 20, an upper limit value of the number of days of use of a profile, an upper limit value of the number of times of use, or an upper limit value of the number of pages can be set in the upper limit input section 2305. The method of setting the upper limit value is not limited to the above-described example, and for example, both the expiration date and the upper limit number of uses may be set.

The fee input section 2306 is an input area for inputting a sales fee desired by the printing company 10a. The execution key 2311 is a key for executing registration of profile information. The sales fee of the profile may be automatically calculated by the profile management service 90a. The profile management service 90a may include, for example, an automatic profile-fee determination section (for example, an automatic calculation key) that determines a fee by evaluating the characteristics and purchase history of a profile registered on the server using the following indexes. Index (1) Rarity: the smaller the number of profiles of the same type, the more points are added. Index (2) Purchase frequency: the more frequently a profile is purchased from many printing companies, the more points are added to the profile. Index (3) Evaluation: a printing company can input an evaluation after use of a profile, and the higher the evaluation of the profile, the more points are added to the profile. The recommended price may be calculated based on the calculated amount from each evaluation index and the desired amount of the printing company, or the recommended price may be calculated from the evaluation indexes with respect to the desired fee input by the printing company and be presented. In addition, the printing company may be able to further re-set the amount with reference to the calculated and presented amount. In addition, an appropriate fee may be calculated and presented by an artificial intelligence (AI) or the like using variable data such as indexes, accumulated data, and trends. The fee input section and the automatic profile-fee determination section are examples of a profile fee setting section that sets a profile fee.

After the profile information is confirmed and input on the profile sales registration screen 2300, the printing company 10 presses the execution key 2311.

Step S42

When the printing company 10a presses the execution key 2311, the encryption processing unit 21 of the management server 11a of the printing company 10a encrypts profile information to be registered on the profile sales registration screen 2300 with the private key (first private key) of the printing company 10a stored in the encryption key storage unit 23 (an example of encryption processing on profile information).

Step S43

The profile registration request unit 25 of the management server 11a transmits the profile information encrypted by the encryption processing unit 21 via the communication unit 14, together with a registration request for requesting registration to the profile management service 90a serving as a profile sales site. The profile management service 90a receives the registration request and the encrypted profile information.

Step S44 and Step S45

When the registration request and the encrypted profile information are received by the communication unit 94, the encryption processing unit 91 of the profile management service 90a decrypts the profile information with the public key (first public key) stored in the encryption key storage unit 98 corresponding to the printing company 10a that is the transmission source of the profile information (an example of decryption processing on profile information). The encryption processing unit 91 stores (registers) the decrypted profile information in the profile information storage unit 99.

Step S46

The administrator terminal 12 of the printing company 10b displays a profile purchase screen 2400 for purchasing a profile registered in the profile management service 90a as illustrated in FIG. 21 on its own display device in accordance with the operation of the printing company 10b.

As illustrated in FIG. 21, the profile purchase screen 2400 includes a profile list display section 2401. The profile list display section 2401 is an area for displaying a list of profile information registered in the profile information storage unit 99. In the example illustrated in FIG. 21, a profile name, a seller (printing company 10), a fee, an upper limit, a description text, a sheet of paper, ink, and a registration date are displayed as profile information. In this case, the profile distribution unit 93 of the profile management service 90a may grasp ink and sheet of paper (an example of a recording medium) that can be used by the printing machine 30 from the device information of the printing machine 30 of the printing company 10b, transmit a list of only profile information including the ink and the sheet of paper as use conditions (a list of profile information satisfying the use conditions of the printing machine 30) to the management server 11a, and the management server 11a may display the list on the profile purchase screen 2400. In order to generate and display the profile purchase screen 2400 of FIG. 21, the profile purchase request unit 26 of the management server 11a requests acquisition of a list of purchasable profiles, and the profile management service 90a transmits the list to the management server 11a.

The printing company 10b checks the contents of the profile information on the profile purchase screen 2400, and presses a purchase key corresponding to the profile information desired to be purchased. The timing at which the profile information is purchased may be a timing at which profile information corresponding to a job taken by the printing company 10b or a job distributed from the cloud system 50a is purchased, or any timing at which the profile information is desired to be purchased even in a state in which there is no particular target job.

On the profile purchase screen 2400, not only profile information but also ink or sheet of paper (an example of a recording medium) satisfying the use condition of each profile information may be purchased (ordered) at the same time. In this case, when the profile distribution unit 93 of the profile management service 90a receives a purchase request for ink or sheets of paper from the management server 11a, the profile distribution unit 93 may order the ink or sheets of paper to an external site or the like.

Step S47

When the printing company 10b presses the purchase key, the profile purchase request unit 26 of the management server 11a of the printing company 10b transmits a purchase request for requesting the profile management service 90a to purchase the profile information selected to be purchased on the profile purchase screen 2400 to the profile management service 90a via the communication unit 14. The profile management service 90a receives the purchase request. In this embodiment, as illustrated in steps S46 and S47 of FIG. 17, a profile is purchased from the administrator terminal 12 via the management server 11a. However, in some embodiments, the administrator terminal 12 may be connected to a profile management service (profile sales site) 90a to directly transmit and receive a request for a list of purchasable profiles, acquisition of the list, and a purchase request. The processing from step S48 on of the profile management service 90a that received the purchase request is performed in the same manner. In this case, there is no need to transmit and receive a list of purchasable profiles between the management server 11a and the profile management service 90a.

Step S48

When the communication unit 94 receives a purchase request from the management server 11a of the priming company 10b, the profile distribution unit 93 of the profile management service 90a reads profile information indicated by the purchase request from the profile information storage unit 99.

Step S49

The encryption processing unit 91 of the profile management service 90a encrypts the profile information read out by the profile distribution unit 93 using the public key (second public key) stored in the encryption key storage unit 98 corresponding to the printing company 106 that is the request source (an example of encryption processing on profile information).

Step S50

The profile distribution unit 93 distributes (transmits) the profile information encrypted by the encryption processing unit 91 to the management server 11a of the printing company 10b via the communication unit 94. The management server 11a of the printing company 10b receives the encrypted profile information.

Step S51 and Step S52

The encryption processing unit 21 of the management server 11a of the printing company 10b decrypts the encrypted profile information purchased from the profile management service 90a received by the communication unit 14 with the private key (second private key) of the printing company 10b itself stored in the encryption key storage unit 23 (an example of decryption processing on profile information). The encryption processing unit 21 stores the decrypted profile information in the profile information storage unit 22.

Regarding the purchase of the profile information from the printing company 10a to the printing company 10b as described above, the purchase history may be stored in a block chain.

Step S53

The profile distribution unit 93 of the profile management service 90a sends the distributed profile information, the information on the printing company 10a that is the provider, and the information on the printing company 10b having purchased the profile information to the billing information notifying unit 66 of the job management service 60. The billing information notifying unit 66 notifies the billing service 80 of withdrawal information from the printing company 10b who purchased the profile information and deposit information to the printing company 10a who provided the profile information. The profile distribution unit 93 may directly notify the billing service 80 of the deposit-and-withdrawal information. Upon receiving the notification, the billing processing unit 81 of the billing service 80 registers the withdrawal information of the printing company 10a and the deposit information of the printing company 10b in the billing information storage unit 89, and requests the banking system corresponding to the bank accounts of the printing companies 10a and 10b to perform transfer processing based on the information.

Step S54

The device information transmission unit 32 of the printing machine 30 of each printing company 10 (for example, the printing company 10b) transmits device information related to the printing machine 30 to the device management service 70 via the communication unit 31.

Step S55

The device information registration unit 72 of the device management service 70 registers the device information received via the communication unit 71 in the device information storage unit 79. Next, the device information providing unit 73 of the device management service 70 provides the job management service 60 with the device information registered in the device information storage unit 79. The device information receiving unit 65 of the job management service 60 receives the device information from the device management service 70.

Step S56

The administrator terminal 12 of the printing company 10a displays a job registration screen 2000 for registering a job as illustrated in FIG. 8 on its own display device in accordance with the operation of the printing company 10a. The administrator terminal 12 sets a profile to be applied to the job and registers the job on the job registration screen 2000.

Specifically, the profile setting unit 20 of the management server 11a of the printing company 10a sets the profile selected by the profile selection section 2005 and information related to the profile (e.g., profile name, profile description, sheet of paper, ink, expiration date, upper limit number of uses, and usage fee) as profile information for the print data included in the job information selected by the file selection section 2002 in accordance with an operation on the administrator terminal 12. The profile information that can be selected by the profile selection section 2005 can be selected not only from profile information originally possessed by the printing company 10a but also from profile information of another printing company 10b having purchased from the profile management service 90a (profile sales site). The job information accepting unit 17 of the management server 11 receives the information input on the job registration screen 2000 as job information including the profile information set by the profile setting unit 20. The job information accepting unit 17 registers (stores) the received job information in the job information storage unit 19.

Step S57

The job execution determination unit 16 of the management server 11a determines whether the job received by the job information accepting unit 17 is to be executed by the printing company 10a (in other words, to be printed by the printing machine 30 of the printing company 10a) or to be transmitted to the cloud system 50a. For example, the job execution determination unit 16 predicts the state of the printing machine 30 at the start of the idle time from the current state of the printing machine 30 and the schedule information scheduled to execute the job, and determines whether the newly accepted job can be completed by the end of the idle time. The job execution determination unit 16 applies the profile information set by the profile setting unit 20 to the job information accepted by the job information accepting unit 17, and determines whether print output of the printing machine 30 is executable.

When the job execution determination unit 16 determines that the job can be executed by the printing company 10a, the schedule generation unit 15 of the management server 11a generates schedule information and stores the schedule information in the job information storage unit 19. The job execution instruction unit 18 of the management server 11a instructs the printing machine 30 to execute the job based on the schedule information generated by the schedule generation unit 15.

Hereinafter, a case where the job execution determination unit 16 determines that the job cannot be executed by the printing company 10a is described.

Step S58

The communication unit 14 of the management server 11a transmits job information to the job management service 60 when the job execution determination unit 16 determines that the job cannot be executed by the printing company 10a. The communication unit 61 of the job management service 60 receives the job information.

Step S59

The job information registration unit 62 of the job management service 60 stores and registers the job information received by the communication unit 61 in the job information storage unit 69. The job information distribution unit 64 of the job management service 60 refers to the newly registered job information, the existing job information and schedule information, and the device information received from the device management service 70, and determines a printing machine 30 that can execute the job among the printing machines 30 of the printing company 10b other than the printing company 10a. Here, it is assumed that the job information distribution unit 64 determines a printing machine 30 of the printing company 10b as the printing machine 30 that can execute the job. The determination as to whether each printing machine 30 can execute a job and the determination as to which printing machine 30a job is to be distributed to when a plurality of printing machines 30 can execute the job may be the same as the determination as to whether a job can be executed by the job execution determination unit 16. However, here, since profile information is not included in the job information received by the communication unit 61, the determination is performed without using the profile information. The job information distribution unit 64 also generates schedule information related to a job to be distributed to the printing machine 30 of the determined printing company 10b. Note that a device of a printing company that has purchased a profile necessary for a job may be automatically selected or displayed as a candidate for selection.

Step S60

In addition, the job information distribution unit 64 transmits job information and schedule information to the management server 11a of the printing company 10b having the determined printing machine 30 via the communication unit 61. The communication unit 14 of the management server 11a of the printing company 10b receives the job information and the schedule information. If the printing company 10b does not have a profile necessary for a job, automatic purchase processing may be performed in the profile management service before job information is transmitted in step S60. In this case, steps S61 and S62 in FIG. 17 may be omitted.

Step S61

The display control unit 24 of the management server 11a of the printing company 10b causes the administrator terminal 12 to display a job execution screen 2100 for executing the job information received by the communication unit 14 as illustrated in FIG. 18. In this case, the display control unit 24 may display the job execution screen 2100 on the administrator terminal 12 when the communication unit 14 receives the job information, or may display a pop-up screen or the like indicating that the job information has been received on the administrator terminal 12 and display the job execution screen 2100 after a predetermined operation is performed on the pop-up screen on the administrator terminal 12. When the printing company 10b holds a profile necessary for the job (for example, when the printing company 10B has already purchased the profile and has not reached the upper limit of use), steps S61 and S62 in FIG. 17 may be omitted.

As illustrated in FIG. 18, the job execution screen 2100 includes a profile selection section 2105 and an execution key 2111. The job execution screen 2100 further displays a customer name ("customer"), a file name ("file"), the number of copies, and a sheet of paper for confirming the contents of the job information.

A profile selection section 2105 is an input area for selecting a profile to be applied when the received job information is printed out. The execution key 2111 is a key for causing the printing machine 30 to execute a job.

When there are a plurality of pieces of job information that are received by the communication unit 14 and are in the standby state, one piece of job information may be selected from the plurality of pieces of job information on the job execution screen 2100.

Step S62

The profile setting unit 20 of the management server 11*a* of the printing company 10*b* sets the profile selected by the profile selection section 2105 and information related to the profile (e.g., profile name, profile description, sheet of paper, ink, expiration date, upper limit number of uses, and usage fee) as profile information for the print data included in the selected job information in accordance with an operation on the administrator terminal 12. The profile information that can be selected by the profile selection section 2105 can be selected not only from profile information originally possessed by the printing company 10*b* but also from profile information of another printing company 10 purchased from the profile management service 90*a* (profile sales site) (e.g., profile information of the printing company 10*a* purchased in step S50). The management server 11*a* of the printing company 10*b* may access the profile management service 90*a* at the timing when the job execution screen 2100 is displayed, purchase new profile information, and set the new profile information in the job information. If the printing company 10*b* does not have a profile necessary for the job, a guide to purchase a specific profile in step S62 or a list of candidate profiles may be displayed.

The job information accepting unit 17 of the management server 11*a* may receive job information including profile information set by the profile setting unit 20 and register (store) the received job information in the job information storage unit 19.

Step S63

The job execution instruction unit 18 of the management server 11 of the printing company 10*b* instructs the printing machine 30 to execute a job to which the profile information set by the profile setting unit 20 is applied, in accordance with the schedule information received by the communication unit 14.

Step S64

The job execution unit 33 of the printing machine 30 of the printing company 10*b* executes the job in response to a job execution instruction from the job execution instruction unit 18. For example, the job execution unit 33 causes the printer section 932 to print out the print data included in the job information on a recording medium such as a sheet of paper by using the profile of the profile information set by the profile setting unit 20.

Step S65

When the execution of the job is completed, the job execution unit 33 transmits a completion notification of the execution of the job to the management server 11*a*. The management server H a receives the completion notification of the execution of the job.

Step S66

When the communication unit 14 receives the completion notification of the job, the profile setting unit 20 of the management server 11*a* checks whether the usable condition indicated by the profile information applied to the job is no longer satisfied. Specifically, the profile setting unit 20 checks whether the expiration date included in the profile information has been exceeded or whether the upper limit number of uses included in the profile information has been exceeded. When the profile setting unit 20 determines that the usable condition indicated by the profile information is no longer satisfied, the profile setting unit 20 deletes the profile information. With such a mechanism, the printing company 10*a* who has registered sales of the profile information to the profile management service 90*a* can collect the fee of the profile information and allows another printing company 10*b* to use the profile information within a range satisfying a desired usable condition.

The management server Ha may transmit a usage log using (applying) the profile information to the cloud system 50*a*, and the cloud system 50*a* may manage the usage state of the profile information. In this case, the profile distribution unit 93 of the cloud system 50*a* can prompt the printing company 10*b* to perform additional purchase of profile information when the expiration date or the upper limit number of uses of the profile is approaching, or can generate an additional charge or request deletion of the profile related to the profile information when the expiration date or the upper limit number of uses is exceeded.

Step S67

The communication unit 14 of the management server 11*a* transmits the job execution completion notification received from the printing machine 30 to the job management service 60. The communication unit 61 of the job management service 60 receives the job execution completion notification.

Step S68

The communication unit 61 of the job management service 60 stores the received job completion notification in the job information storage unit 69, and the prediction parameter correcting unit 63 corrects the prediction parameters. The prediction parameters may be corrected, for example, periodically.

Step S69

The billing information notifying unit 66 of the job management service 60 notifies the billing service 80 of the withdrawal information of the printing company 10*a* and the deposit information of the printing company 10*b* for the job information. Upon receiving the notification, the billing processing unit 81 of the billing service 80 registers the withdrawal information of the printing company 10*a* and the deposit information of the printing company 10*b* in the billing information storage unit 89, and requests the banking system corresponding to the bank accounts of the printing companies 10*a* and 10*b* to perform transfer processing based on the information.

Note that the encrypted communication method for the profile information used in FIG. 17 described above is not limited to the above-described method, and encryption communication using the electronic signature described above can also be applied.

As described above, in the device system 100*a* according to this embodiment, the communication unit 94 acquires (receives) profile information including a profile to be applied to print output from the management server 11*a* of the printing company 10*a*, the encryption processing unit 91 decrypts the profile information acquired by the communication unit 94 and stores the decrypted profile information in the profile information storage unit 99, and the profile distribution unit 93 distributes the profile information to the management server 11*a* of the printing company 10*b* in response to a purchase request. Thus, profile information of a specific company (for example, the printing company 10*a*) is distributed to other companies (for example, the printing company 10*b*), thus allowing other companies to print with the same quality.

The communication unit 94 receives (acquires) profile information encrypted with the private key of the printing company 10*a* from the management server 11*a* of the printing company 10*a*. The encryption processing unit 91 decrypts the profile information with the public key of the printing company 10a and encrypts the decrypted profile information with the public key of the printing company 10b. The profile distribution unit 93 distributes the decrypted profile information to the management server 11a of the printing company 10b that can decrypt the profile information with the private key of the printing company 10b. Thus, profile information of a specific company (for example, the printing company 10a) can be safely distributed to other companies (for example, the printing company 10b).

In a digital commercial printing apparatus, a color profile that is an ICC profile or the apparatus is adjusted in accordance with an image, ink, paper type, and the like to be printed. Outputting an optimal printed matter by such adjustment is a task with a high degree of difficulty, and the setting value is data with a high value that can be said to be know-how of each printing company. In general, such profile data, setting method, and the like are know-how of a printing company, and are rarely disclosed to the outside. Therefore, when there is an ICC profile suitable for an image or the like to be printed, it is desirable that the ICC profile can be obtained by other printing companies. Printing companies with reduced print demand also need to seek new sources of revenue. On the other hand, from the viewpoint of a customer who orders printing, if only a predetermined company has an option for a request to print on a specific sheet of paper, there is a demand for selecting a company from a plurality of companies and requesting printing to the selected company because there may be a case where a company does not meet a sudden delivery date or a case where a transportation cost increases due to an order to a company in a remote place. Embodiments of the present disclosure allow a printing company to obtain ICC profiles created by other companies and to print with similar qualities. Further, the range of selection of the printing company by the customer is widened, and the apparatus operation rate of the printing company can be enhanced.

In the above-described embodiments, when at least one of the functional units of the cloud system 50 or 50a and the management server 11 or 11a is implemented by executing a program, the program is provided by being incorporated in advance in a ROM or the like. In addition, in each of the above-described embodiments, the programs executed by the cloud system 50 or 50a and the management server 11 or 11a may be recorded and provided in a computer-readable recording medium such as a compact disc read only memory (CD-ROM), a flexible disk (FD), a compact disc-recordable (CD-R), or a digital versatile disc (DVD) as an installable or executable file. In each of the above-described embodiments, the program executed by the cloud system 50 or 50a and the management server 11 or 11a may be stored in a computer connected to a network such as the Internet and provided to be downloaded via the network. In each of the above-described embodiments, the program executed by the cloud system 50 or 50a and the management server 11 or 11a may be provided or distributed via a network such as the Internet. In addition, in each of the above-described embodiments, the program executed by the cloud system 50 or 50a and the management server 11 or 11a have a module configuration including at least one of the above-described functional units. As actual hardware, the CPU 501 reads the program from the above-described storage device (for example, the ROM 502 or the HD 504) and executes the program, so that the above-described functional units are loaded and generated on the main storage device.

Although the present disclosure has been described based on the above-described embodiments, embodiments of the present disclosure are not limited to the content illustrated in the above-described embodiments. These points can be modified without departing from the gist of the present disclosure, and can be appropriately determined according to the application form.

The functions of the above-described embodiments may be implemented by one or a plurality of processing circuits. Here, the processing circuit or circuitry in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

The invention claimed is:

1. An information processing system, comprising:
processing circuitry configured to:
acquire profile information including a profile to be applied to print output from a first company system, the profile information being data in which a usage fee is set;
register the profile information in a memory in response to a sales registration request from the first company system and manage the profile information; and
distribute, to a second company system, particular profile information indicated by a purchase request from the second company system among the profile information registered in the memory so as to apply the particular profile information to a job executed by a printing machine of the second company system.

2. The information processing system according to claim 1, wherein the processing circuitry is further configured to:
encrypt the profile information acquired from the first company system; and
distribute the encrypted profile information to the second company system.

3. The information processing system according to claim 1, wherein the processing circuitry is further configured to:
acquire, from the first company system, the profile information having been encrypted using a first private key of the first company system;
decrypt the profile information with a first public key of the first company system;
encrypt the particular profile information with a second public key of the second company system; and
distribute the particular profile information encrypted with the second public key to the second company system that can decrypt the profile information with a second private key.

4. The information processing system according to claim 1, wherein the processing circuitry is further configured to:
acquire, from the first company system, the profile information to be applied to a job that is determined to be unexecutable by a printing machine of the first company system;
determine a printing machine of a company system, other than the first company system, that can execute the job to which the profile information is applied; and
distribute the job and the profile information to the second company system that is the company system having the printing machine determined.

5. The information processing system according to claim 1, wherein the processing circuitry is further configured to:
set a fee based on the profile information; and notify the second company system of the fee when the particular profile information is distributed to the second company system.

6. The information processing system according to claim 5, wherein the processing circuitry is further configured to automatically determine the fee of the profile information based on one or more indexes and display the fee in response to the purchase request.

7. The information processing system according to claim 6, wherein
when the second company system performs a print job received by the first company system from a customer, the processing circuitry is configured to execute processing to pay at least a part of a print job fee paid from the customer to the first company system to the second company system, and
when the second company system acquires profile information necessary for the print job registered by the first company system, the processing circuitry is configured to charge a profile fee set by the processing circuitry on the second company system.

8. The information processing system according to claim 1, wherein the processing circuitry is further configured to:
transmit, to the second company system, a list of pieces of profile information that satisfy a use condition of the printing machine held by the second company system, among the profile information registered in the memory; and
distribute the particular profile information, having been selected from the list in the second company system, to the second company system.

9. The information processing system according to claim 1, wherein when the purchase request from the second company system includes a request for ink or a recording medium indicated by the particular profile information of the purchase request, the processing circuitry is configured to order the ink or the recording medium.

10. The information processing system according to claim 1, wherein the particular profile information includes an upper limit number of uses or a usage expiration date.

11. The information processing system according to claim 10, wherein the processing circuitry is further configured to request deletion of the profile included in the particular profile information when the upper limit number of uses or the usage expiration date indicated by the particular profile information is exceeded for the printing machine of the second company system.

12. An information processing method comprising:
acquiring, from a first company system, profile information including a profile to be applied to print output, the profile information being data in which a usage fee is set;
registering the profile information in a memory in response to a sales registration request from the first company system and managing the profile information; and
distributing, to a second company system, particular profile information indicated by a purchase request from the second company system among the profile information registered in the memory so as to apply the particular profile information to a job executed by a printing machine of the second company system.

13. A non-transitory computer-readable storage medium storing computer executable instructions which, when executed by one or more processors, cause the one or more processors to:
acquire, from a first company system, profile information including a profile to be applied to print output, the profile information being data in which a usage fee is set;
register the profile information in a memory in response to a sales registration request from the first company system and manage the profile information; and
distribute, to a second company system, particular profile information indicated by a purchase request from the second company system among the profile information registered in the memory so as to apply the particular profile information to a job executed by a printing machine of the second company system.

14. The information processing system according to claim 1, wherein the profile information further includes a color profile applied during execution of a print job and is data in which information related to a profile including the usage fee is set.

15. The information processing system according to claim 1, wherein the profile information is data in which a usage limit is further set.

16. The information processing system according to claim 1, wherein the profile information is data in which a paper type or an ink type is further set.

17. The information processing system according to claim 1, wherein the profile information is data in which an expiration date is further set.

18. The information processing system according to claim 1, wherein the profile information and job information regarding the job are transmitted in separate communications.

* * * * *